(12) United States Patent
Bennett et al.

(10) Patent No.: US 9,576,321 B2
(45) Date of Patent: Feb. 21, 2017

(54) INFRASTRUCTURE SUPPORTING ONLINE TRANSACTIONS

(75) Inventors: James D. Bennett, Hroznetin (CZ); Christopher C. Winslade, Chicago, IL (US)

(73) Assignee: PayPal, Inc., San Jose, CA (US)

( * ) Notice: Subject to any disclaimer, the term of this patent is extended or adjusted under 35 U.S.C. 154(b) by 1061 days.

(21) Appl. No.: 13/478,090

(22) Filed: May 22, 2012

(65) Prior Publication Data

US 2012/0246025 A1 Sep. 27, 2012

Related U.S. Application Data

(63) Continuation of application No. 13/109,093, filed on May 17, 2011, now Pat. No. 8,181,851, which is a continuation of application No. 12/467,557, filed on May 18, 2009, now Pat. No. 7,942,316, which is a continuation of application No. 09/808,717, filed on Mar. 14, 2001, now Pat. No. 7,539,628.

(60) Provisional application No. 60/214,136, filed on Jun. 26, 2000, provisional application No. 60/214,183, filed on Jun. 26, 2000, provisional application No. 60/190,825, filed on Mar. 21, 2000.

(51) Int. Cl.
| | |
|---|---|
| *G06F 7/00* | (2006.01) |
| *G06Q 40/00* | (2012.01) |
| *G06Q 40/08* | (2012.01) |
| *G06Q 20/20* | (2012.01) |
| *G06Q 30/02* | (2012.01) |
| *G06Q 30/06* | (2012.01) |
| *G06Q 40/02* | (2012.01) |
| *G06Q 40/04* | (2012.01) |

(52) U.S. Cl.
CPC .............. *G06Q 40/08* (2013.01); *G06Q 20/20* (2013.01); *G06Q 30/02* (2013.01); *G06Q 30/0207* (2013.01); *G06Q 30/0222* (2013.01); *G06Q 30/0224* (2013.01); *G06Q 30/0235* (2013.01); *G06Q 30/0239* (2013.01); *G06Q 30/0244* (2013.01); *G06Q 30/0251* (2013.01); *G06Q 30/0253* (2013.01); *G06Q 30/0255* (2013.01); *G06Q 30/0257* (2013.01); *G06Q 30/0261* (2013.01); *G06Q 30/0269* (2013.01); *G06Q 30/0601* (2013.01); *G06Q 30/0605* (2013.01); *G06Q 30/0611* (2013.01); *G06Q 30/0613* (2013.01); *G06Q 30/0625* (2013.01); *G06Q 30/0641* (2013.01); *G06Q 40/025* (2013.01); *G06Q 40/04* (2013.01)

(58) Field of Classification Search
CPC .... G06Q 40/00; G06Q 30/0601; G06Q 40/06; G06Q 40/0601; G06F 7/00
USPC .......... 235/376, 380, 375; 705/30, 35, 26.1, 705/26.2; 726/38–40, 22
See application file for complete search history.

(56) References Cited

U.S. PATENT DOCUMENTS

| | | |
|---|---|---|
| 5,239,462 A | 8/1993 | Jones et al. |
| 5,339,392 A | 8/1994 | Risberg et al. |
| 5,732,400 A | 3/1998 | Mandler et al. |

(Continued)

*Primary Examiner* — Andrew Joseph Rudy
(74) *Attorney, Agent, or Firm* — Drinker Biddle & Reath LLP

(57) ABSTRACT

A system and method for supporting the purchase of products offered for sale. The system and method may include delivering for display to a buyer information regarding the product being offered for sale, along with retrieving profile information relating to the potential buyer from one or more other systems, for use in consummating the purchase of the product.

21 Claims, 19 Drawing Sheets

(56) References Cited

U.S. PATENT DOCUMENTS

| | | |
|---|---|---|
| 5,765,144 A | 6/1998 | Larche et al. |
| 5,797,133 A | 8/1998 | Jones et al. |
| 5,870,771 A | 2/1999 | Oberg |
| 5,903,721 A | 5/1999 | Sixtus |
| 5,940,811 A | 8/1999 | Norris |
| 5,963,915 A | 10/1999 | Kirsch |
| 5,984,180 A | 11/1999 | Albrecht |
| 6,014,645 A | 1/2000 | Cunningham |
| 6,029,149 A | 2/2000 | Dykstra et al. |
| 6,052,674 A | 4/2000 | Zervides et al. |
| 6,055,514 A | 4/2000 | Wren |
| 6,088,686 A | 7/2000 | Walker et al. |
| 6,131,087 A | 10/2000 | Luke |
| 6,141,006 A | 10/2000 | Knowlton et al. |
| 6,141,653 A | 10/2000 | Conklin et al. |
| 6,141,915 A | 11/2000 | Andersen et al. |
| 6,144,948 A | 11/2000 | Walker et al. |
| 6,167,385 A | 12/2000 | Hartley-Urquhart |
| 6,175,922 B1 | 1/2001 | Wang |
| 6,208,979 B1 | 3/2001 | Sinclair |
| 6,233,566 B1 | 5/2001 | Levine et al. |
| 6,236,975 B1 | 5/2001 | Boe et al. |
| 6,285,983 B1 | 9/2001 | Jenkins |
| 6,289,319 B1 | 9/2001 | Lockwood |
| 6,311,169 B2 | 10/2001 | Duhon |
| 6,324,521 B1 | 11/2001 | Shiota et al. |
| 6,324,524 B1 | 11/2001 | Lent et al. |
| 6,332,135 B1 | 12/2001 | Conklin et al. |
| 6,349,300 B1 | 2/2002 | Graf et al. |
| 6,385,594 B1 | 5/2002 | Lebda et al. |
| 6,393,436 B1 | 5/2002 | Vaimberg-Araujo |
| 6,405,181 B2 | 6/2002 | Lent et al. |
| 6,405,281 B1 | 6/2002 | Akerib |
| 6,434,607 B1 | 8/2002 | Haverstock et al. |
| 6,446,048 B1 * | 9/2002 | Wells ............... G06Q 20/102 705/35 |
| 6,453,306 B1 | 9/2002 | Quelene |
| 6,466,981 B1 | 10/2002 | Levy |
| 6,477,575 B1 | 11/2002 | Koeppel et al. |
| 6,477,580 B1 | 11/2002 | Bowman-Amuah |
| 6,484,149 B1 | 11/2002 | Jammes et al. |
| 6,507,823 B1 | 1/2003 | Nel |
| 6,530,880 B2 | 3/2003 | Pagliuca |
| 6,567,791 B2 | 5/2003 | Lent et al. |
| 6,587,841 B1 | 7/2003 | Defrancesco et al. |
| 6,609,110 B1 * | 8/2003 | Dowd ............... G06Q 40/00 705/35 |
| 6,611,816 B2 | 8/2003 | Lebda et al. |
| 6,615,253 B1 | 9/2003 | Bowman-Amuah |
| 6,658,393 B1 | 12/2003 | Basch et al. |
| 6,684,196 B1 | 1/2004 | Mini et al. |
| 6,693,236 B1 | 2/2004 | Gould et al. |
| 6,735,572 B2 | 5/2004 | Landesmann |
| 6,766,302 B2 | 7/2004 | Bach |
| 6,785,661 B1 | 8/2004 | Mandler et al. |
| 6,795,812 B1 | 9/2004 | Lent et al. |
| 6,847,942 B1 | 1/2005 | Land et al. |
| 6,868,395 B1 | 3/2005 | Szlam et al. |
| 6,895,388 B1 | 5/2005 | Smith |
| 6,898,570 B1 | 5/2005 | Tedesco et al. |
| 6,898,577 B1 * | 5/2005 | Johnson ............ G06Q 20/3674 705/317 |
| 6,928,412 B2 | 8/2005 | DeBiasse |
| 6,934,692 B1 | 8/2005 | Duncan |
| 6,941,282 B1 * | 9/2005 | Johnson ............ G06Q 20/04 705/40 |
| 6,950,807 B2 | 9/2005 | Brock |
| 6,957,192 B1 | 10/2005 | Peth |
| 6,970,852 B1 | 11/2005 | Sendo et al. |
| 6,988,085 B2 | 1/2006 | Hedy |
| 7,010,508 B1 | 3/2006 | Lockwood |
| 7,013,289 B2 | 3/2006 | Horn et al. |
| 7,047,219 B1 * | 5/2006 | Martin ............... G06Q 40/00 705/30 |
| 7,069,234 B1 | 6/2006 | Cornelius et al. |
| 7,082,412 B1 | 7/2006 | Treider et al. |
| 7,096,354 B2 | 8/2006 | Wheeler et al. |
| 7,103,565 B1 * | 9/2006 | Vaid ............... G06Q 30/02 705/26.2 |
| 7,103,568 B1 | 9/2006 | Fusz et al. |
| 7,133,846 B1 | 11/2006 | Ginter et al. |
| 7,133,935 B2 | 11/2006 | Hedy |
| 7,143,063 B2 | 11/2006 | Lent et al. |
| 7,165,051 B2 | 1/2007 | Ronning et al. |
| 7,171,371 B2 | 1/2007 | Goldstein |
| 7,181,427 B1 | 2/2007 | DeFrancesco et al. |
| 7,194,436 B2 | 3/2007 | Tammaro |
| 7,219,080 B1 | 5/2007 | Wagoner et al. |
| 7,249,097 B2 | 7/2007 | Hutchison et al. |
| 7,289,964 B1 | 10/2007 | Bowman-Amuah |
| 7,310,617 B1 | 12/2007 | Cunningham |
| 7,318,047 B1 * | 1/2008 | Foth ............... G06Q 20/02 705/26.4 |
| 7,330,873 B2 | 2/2008 | Yoshida et al. |
| 7,353,192 B1 | 4/2008 | Ellis et al. |
| 7,363,267 B1 | 4/2008 | Vincent et al. |
| 7,376,603 B1 | 5/2008 | Mayr et al. |
| 7,389,915 B1 * | 6/2008 | Dyor ............... G06Q 20/04 235/380 |
| 7,395,259 B2 | 7/2008 | Bailey et al. |
| 7,418,424 B2 | 8/2008 | Martin |
| 7,505,939 B2 | 3/2009 | Lent et al. |
| 7,539,628 B2 | 5/2009 | Bennett et al. |
| 7,542,921 B1 | 6/2009 | Hildreth |
| 7,542,922 B2 | 6/2009 | Bennett et al. |
| 7,610,221 B2 | 10/2009 | Cella et al. |
| 7,627,531 B2 | 12/2009 | Breck et al. |
| 7,630,986 B1 | 12/2009 | Herz et al. |
| 7,657,267 B2 | 2/2010 | Kitazato |
| 7,660,751 B2 | 2/2010 | Cella et al. |
| 7,660,752 B2 | 2/2010 | Cella et al. |
| 7,729,959 B1 | 6/2010 | Wells et al. |
| 7,742,966 B2 | 6/2010 | Erlanger |
| 7,769,681 B2 | 8/2010 | Misraje et al. |
| 7,908,226 B2 | 3/2011 | Hutchison et al. |
| 7,938,316 B2 | 5/2011 | Bennett et al. |
| 7,942,316 B2 | 5/2011 | Bennett et al. |
| 8,036,941 B2 | 10/2011 | Bennett et al. |
| 8,051,078 B2 | 11/2011 | Lau et al. |
| 8,065,201 B2 | 11/2011 | Perkowski |
| 8,117,120 B2 | 2/2012 | Misraje et al. |
| 8,145,563 B2 | 3/2012 | Misraje et al. |
| 8,175,909 B1 | 5/2012 | Pileri et al. |
| 8,177,124 B2 | 5/2012 | Bennett et al. |
| 8,181,851 B2 | 5/2012 | Bennett et al. |
| 8,185,487 B2 | 5/2012 | Tuzhilin et al. |
| 8,306,937 B2 | 11/2012 | Otto |
| 8,359,231 B2 | 1/2013 | Fitzpatrick et al. |

* cited by examiner

INFRASTRUCTURE SUPPORTING ONLINE TRANSACTIONS

CROSS-REFERENCE TO RELATED APPLICATIONS

The present application is a continuation of Ser. No. 13/109,093, filed on May 17, 2011, now U.S. Pat. No. 8,181,851, which is a continuation of Ser. No. 12/467,557 filed on May 18, 2009, now U.S. Pat. No. 7,942,316, which is a continuation of Ser. No. 09/808,717 filed on Mar. 14, 2001, now U.S. Pat. No. 7,539,628, which makes reference to, and claims priority to and the benefit of, U.S. provisional application Ser. No. 60/190,825 filed on Mar. 21, 2000, Ser. No. 60/214,183 filed on Jun. 26, 2000, and Ser. No. 60/214,136 filed on Jun. 26, 2000.

INCORPORATION BY REFERENCE

Each of the above-identified applications is incorporated by reference herein. The following applications are also incorporated by reference: (1) provisional application Ser. No. 60/213,912, filed on Jun. 26, 2000; (2) provisional application Ser. No. 60/214,188, filed on Jun. 26, 2000; (3) Ser. No. 09/808,722, filed on Mar. 14, 2001, now U.S. Pat. No. 8,036,941 (4) Ser. No. 09/808,723, filed on Mar. 14, 2001, now U.S. Pat. No. 7,542,922; and (5) Ser. No. 13/397,825, filed on Feb. 16, 2012, now pending.

STATEMENT REGARDING FEDERALLY SPONSORED RESEARCH

N/A

BACKGROUND

1. Technical Field

The present invention relates generally to an online purchasing system; and, more particularly, it relates to an online affordability-based purchasing system that is operable to perform screening, filtering, and analysis for purchases and potential purchases among various lenders and sellers of good(s) and/or service(s).

2. Related Art

Conventional loan approval methods are time-consuming and often involve a considerable amount of wasted effort on the part of buyers, sellers and lenders alike. Typically, when a buyer desires to finance a purchase, the buyer initially spends a significant amount of time researching and analyzing various products, often with the assistance of a seller, before selecting a desired product. The buyer then typically spends additional time researching and analyzing various loans of one or more lenders, again often with the assistance of a seller, before selecting a desired loan. The buyer provides the lender or seller with extensive personal financial information, which the lender or seller uses to calculate whether or not the buyer is qualified to finance the selected product with the selected loan.

If the buyer is not qualified, as is often the case, the buyer must select a different product, a different loan, or both, requiring that the entire time-consuming process be repeated. In many cases, the buyer and the lender or seller undertake several iterations of the process before achieving loan approval.

In addition, once loan approval is finally achieved using conventional methods, the seller is not able to upsell without having to start over. In other words, if a seller desires to sell upgrades for a selected product or a more expensive product, the buyer and seller must again undertake the entire time-consuming loan approval process before knowing whether the buyer qualifies to finance the upgrades or the more expensive product.

Conventional loan approval methods are also rigid, requiring that the same steps be performed regardless of the type of product the buyer seeks to finance. Such methods do not permit the seller or lender to modify loan approval processing, or perform different processing altogether, depending on the type of product sought to be financed.

Obtaining loan approval using conventional methods is also very labor-intensive. This is particularly true in situations where the seller is assisting the buyer in the loan approval process without lender involvement. Ordinarily in such situations, sellers associate with one or more lenders, and obtain loan parameters from each lender. The seller uses these parameters in calculating, often manually using an adding machine or calculator, to determine whether or not the buyer qualifies for a particular loan. Lenders modify their parameters regularly, forcing the seller to keep track of all modifications. In some instances, a seller approves a buyer for a particular loan, only to find out later that the parameters used for approval are no longer valid. The seller must then recalculate whether or not the buyer is approved using modified parameters, and if not, select a different lender and/or loan, or have the buyer select a different product entirely, to ultimately achieve loan approval. The process is time-consuming and often frustrating for both the seller and the buyer.

Also, in such situations where a seller is assisting a buyer in the loan approval process without lender involvement, the buyer is often unknowingly placed in an adverse financial position relative to the seller. Specifically, a seller typically receives a percentage of the financial amount (i.e., points) for originating a loan with a lender. As mentioned above, a seller usually associates with multiple lenders, and will attempt to "sell" to the buyer a loan that provides the seller with the greatest amount of points, regardless of whether the interest rate or other parameters of the loan are the best available to the buyer. Conventional loan approval methods do not provide financial incentive to the seller to identify and present loans most favorable to the buyer.

Conventional online loan platforms also suffer from similar problems. For example, such platforms typically provide a buyer with a credit application that, upon completion and submission by the buyer, is forwarded to a lender or lenders. The application is not processed in real time, but instead is placed in queue where it is eventually processed by a loan officer, often several hours to several days later. The buyer must wait for a response from each lender, and is not permitted to ascertain the effect that varying loan parameters may have on the amount the buyer is qualified to finance. If a buyer desires to modify the down payment amount or the loan term, the buyer must start all over again by completing and submitting another application. The delay inherent in such online platforms often causes buyers to simply walk away from the purchase.

Even those conventional online loan platforms that claim to offer "automated loan processing" still typically only provide a buyer with means for automated data entry. These platforms still typically require participation by a loan officer, and still take several hours to several days for loan approval.

Further limitations and disadvantages of conventional and traditional systems will become apparent to one of skill in the art through comparison of such systems with the present invention as set forth in the remainder of the present application with reference to the drawings.

SUMMARY OF THE INVENTION

Aspects of the present invention may be found in an online affordability-based purchasing system that comprises a first web server used by an individual, such as a buyer, seller or lender, for example, to review, via a computer running browser software, product information regarding products being offered online. The first web server may be that used by a single seller's sales site or by a single lender's system, or may be that of a third party multi-seller sales system or multi-lender system, for example. The computer enables the individual to enter personal information about a buyer, and upon request, to obtain credit report information, using all or a portion of the personal information, from a second web server, such as that of a credit reporting agency, for example. The credit report information, or some portion of it, is then used to determine at least the likelihood of the buyer being approved for financing of at least one of the products being offered online.

In one embodiment, the individual enters the buyer's personal information and makes the request via a web page (or pages) interface that is delivered by the first web server, or a third web server, to the computer. The third web server may be that of a third party affordability portal, for example. A software engine, which may be associated with any one of the web servers or the computer, determines at least the likelihood of the buyer being approved for financing. The computer may then display an indication to the individual of such likelihood.

In one embodiment, the indication is a notification of pre-approval or approval with regard to at least one financing vehicle (which may be, for example, a loan, revolving credit, lease, etc.). In an embodiment where the software engine is associated with one of the web servers, the indication may be delivered to the computer via a web page or pages. The computer may then respond to input via the web page or pages to initiate purchase of one or more of the products using financing. For example, the individual can select a desired financing vehicle, and initiate purchase of a product using the selected financing vehicle.

Other aspects, advantages and novel features of the present invention will become apparent from the following detailed description of the invention when considered in conjunction with the accompanying drawings.

BRIEF DESCRIPTION OF THE DRAWINGS

A better understanding of the present invention can be obtained when the following detailed description of various exemplary embodiments are considered in conjunction with the following drawings.

DETAILED DESCRIPTION OF THE INVENTION

Figure 1:
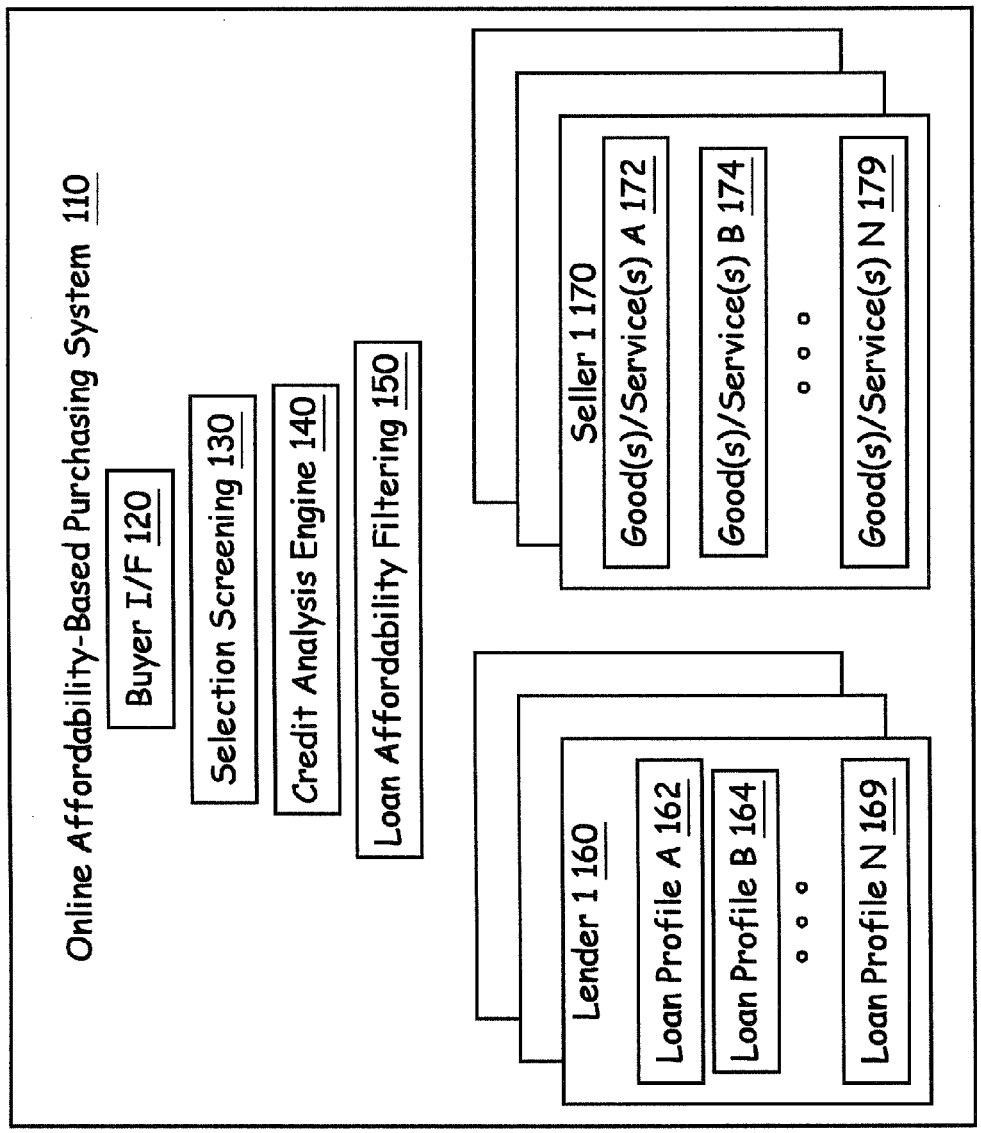
FIG. 1 is a system diagram illustrating an online, affordability-based purchasing system in accordance with the present invention.

FIG. 1 is a system diagram illustrating an online, affordability-based purchasing system 110 in accordance with the present invention. The online affordability-based purchasing system 110 enables a buyer to peruse a number of available good(s) and/or service(s) ("product(s)") to determine which of the products the buyer would like to purchase. Within the context of the detailed description of the invention contained herein, reference to a buyer also includes a potential buyer, as well as a buyer/potential buyer who is invoking the system to determine the availability of products for purchase or potential purchase. The online, affordability-based purchasing system 110 also enables a buyer to obtain financing for those products the buyer desires to purchase on credit. Within the context of the detailed description of the invention contained herein, reference to a loan, financing or credit also includes lease.

The online, affordability-based purchasing system 110 may include, among other components, a buyer interface (I/F) 120 that is operative to enable a buyer to interface with a lender 1 160 and a seller 1 170. The lender 1 160 contains a number of loan profiles illustrated by, for example, a loan profile A 162, a loan profile B 164, and a loan profile N 169. In addition, multiple lenders are included within the scope and spirit of the invention as illustrated in the FIG. 1, each containing a number of loan profiles in similar fashion to the lender 1 160. The buyer interface (I/F) 120 is operable to interface with each of these lenders as well.

Similarly, the seller 1 170 offers a number of good(s) and/or service(s) illustrated by, for example, a good(s) and/or service(s) A 172, a good(s) and/or service(s) B 174, and a good(s) and/or service(s) N 179. In addition, multiple sellers are included within the scope and spirit of the invention as illustrated in the FIG. 1, each containing a number of good(s) and/or service(s) in similar fashion to the seller 1 170. The buyer interface (I/F) 120 is operable to interface with each of these sellers as well.

The online, affordability-based purchasing system 110 includes, for example, a selection screening component 130, a credit analysis engine 140 and loan affordability filtering component 150. The selection screening component 130 enables a buyer to select desired products for analysis or purchase as well select desired loans. A buyer, via the buyer interface (IF) 120, provides buyer information to the credit analysis engine 140. The credit analysis engine 140 uses the buyer information, loan profile or parameter information of one or more lenders, and buyer credit information to determine the specific product(s) the buyer can afford to finance. The loan affordability filtering screening component 150 then indicates to the buyer those specific product(s) and the specific loan(s) that can be used to finance those product(s).

The loan profile or parameter information used by the credit analysis engine 140 may or may not require that the specific product(s) of interest and/or the seller(s) of those product(s) be considered in affordability calculations. For example, for loans that apply to all product(s) and seller(s), the credit analysis engine 140 simply calculates a maximum loan amount that the buyer can afford for each particular loan of each lender, without considering the specific product(s) of interest and/or the seller(s) of those product(s). The calculated maximum loan amount for each loan is then beat against the products of interest, and the specific product(s) that the buyer can afford to finance are identified or selected. The identified product(s), and the loan(s) applicable to each, are then displayed.

Some loan profiles may, however, require that the product(s) and/or the seller(s) be considered. In other words, a loan may only apply to a particular product, to a particular model of a product and/or to a particular seller. For example, in the case where the product of interest is an automobile or other vehicle, a lender may only offer a certain interest rate (e.g., 2.9%) for a specific manufacturer's model (e.g., Ford Explorer). Alternatively, a lender may only offer loans for specific manufacturer's products, because, for example, those products typically have a higher residual or resale value. Or a lender may only finance a certain type of product, such as an automobile or home, for example. In any case, the credit analysis engine 140 is "smart" in that it uses this type of limiting information in calculating affordability.

Specifically, the credit analysis engine 140 is operable to beat the various loan profiles, for example, the loan profile A 162, the loan profile B 164, up to the loan profile N 169 of FIG. 1, against the available good(s) and/or service(s), for example, the good(s) and/or service(s) A 172, the good(s) and/or service(s) B 174, up to the good(s) and/or service(s) N 179 of FIG. 1, to identify or select those good(s) and/or service(s) that a buyer is qualified to finance. Only those good(s) and/or service(s) that a buyer is qualified to finance are then displayed to the buyer. Alternatively, all of the good(s) and/or service(s) selected by the buyer are displayed, and those good(s) and/or service(s) for which the buyer does not qualify for financing are indicated as such upon display.

In any case, the buyer may select a product and an associated loan using the selection screening component 130 and close the deal. As discussed more completely below, the buyer may also use the selection screening component 130 prior to the credit analysis and affordability functionality to pre-select only a portion of all the available products. Only these pre-selected products are then used in the affordability analysis.

The online, affordability-based purchasing system 110 may also be used to provide credit advice to a buyer. For example, the online, affordability-based purchasing system 110 may be implemented to enable the buyer to better manage the buyer's own finances so that the buyer may maximize his/her affordability-based financing. In one instance, for example, the credit analysis engine 140 may identify that if a buyer changes certain financial variables, such as, for example, reducing his/her revolving debt by a certain amount, increasing the down payment being offered by a certain amount, and/or modifying the loan term, the buyer would then qualify to finance more expensive or a greater number of product(s), or qualify for a greater number of loans. The credit analysis engine 140 may then cause all or a portion of this information to be displayed to the buyer to enable the buyer to modify the buyer's personal financial variables, if desired.

Of course, it should be understood that the functionality of the credit analysis engine 140 and the affordability filtering component 150 may be incorporated into a single engine or component.

Figure 2:
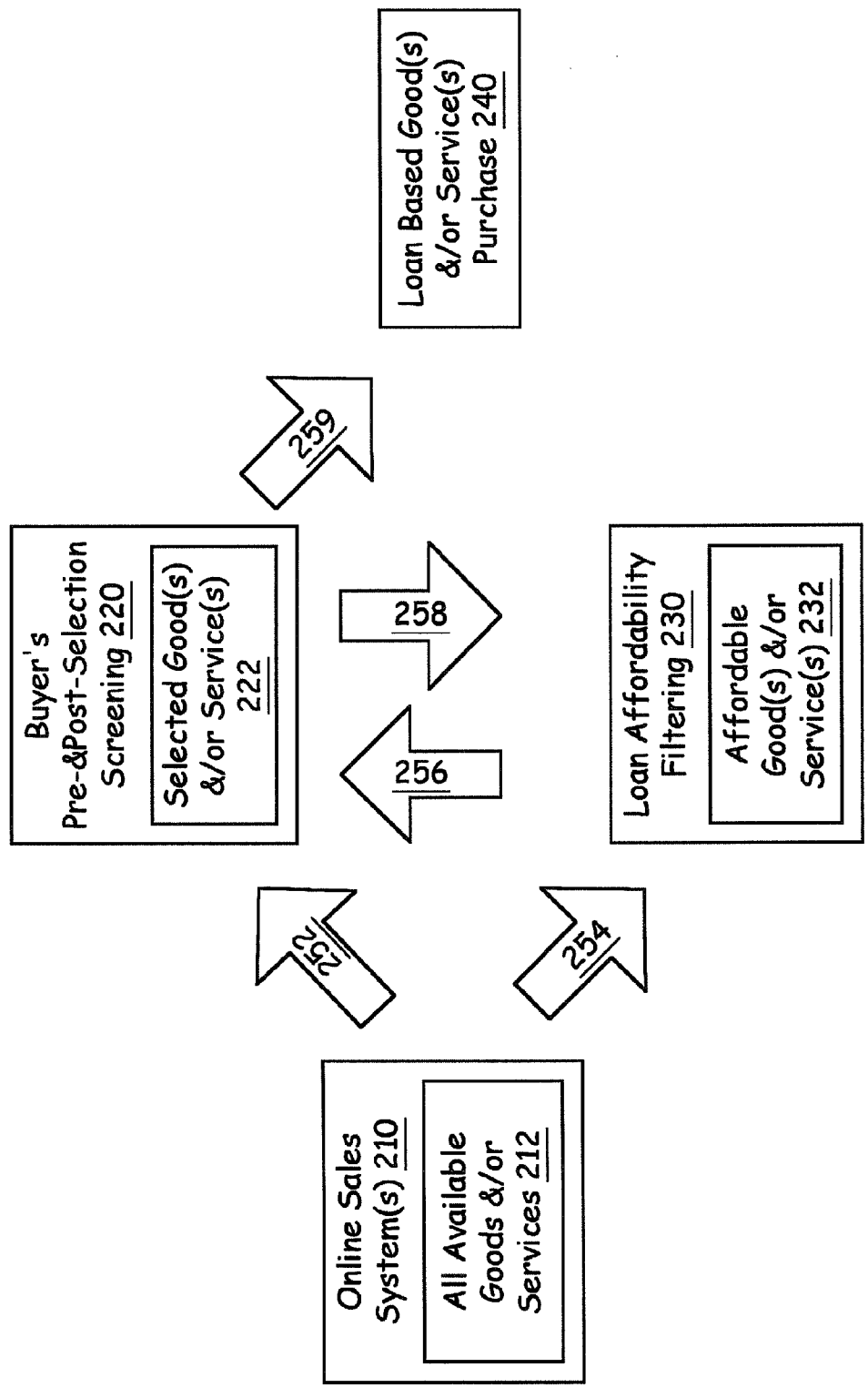
FIG. 2 is a flow diagram illustrating exemplary operational flow of the online, affordability-based purchasing system of FIG. 1.

FIG. 2 is a flow diagram illustrating exemplary operational flow of the online, affordability-based purchasing system of FIG. 1. The system is operable for a buyer to first enter an online sales system(s) 210. In choosing a path 254, the buyer elects loan affordability filtering 230 based on all available good(s) and/or service(s) 212 that are offered within the system. The loan affordability filtering 230 determines those affordable good(s) and/or service(s) 232 from all available good(s) and/or service(s) 212. The buyer is provided with only those good(s) and/or service(s) that the buyer can afford with or without financing. In other words, the system performs loan affordability filtering and displays only those good(s) and/or service(s) for which the buyer can qualify for financing, and/or good(s) and/or service(s) that the buyer may purchase outright without financing. Then, following a path 258, the buyer selects the desired goods and/or service(s) 222 using post-selection screening 220. Finally, following a path 259, the buyer purchases the selected, affordable good(s) and/or service(s), as indicated at loan based good(s) and/or service(s) purchase 240. The sequence via the paths 254, 258, and 259 represents one embodiment of the operational flow of the invention that provides for no pre-selection of good(s) and/or service(s).

Alternatively, the buyer enters the online sales system(s) 210 and, following a path 252, elects to perform pre-selection screening 220. The buyer pre-selects certain good(s) and/or service(s) from all available good(s) and/or service(s) 212 that are offered within the system. The buyer may then purchase the pre-selected goods via the loan based good(s) and/or service(s) purchase 240 if the buyer already has financing for the purchase. Alternatively, following a path 256, the buyer may elect loan affordability filtering 230, which selects and displays only those of the pre-selected good(s) and/or service(s) 222 that the buyer can afford to finance. The buyer may then select one of the affordable good(s) and/or service(s) 232, and purchase, following path 259, the selected good(s) and/or service(s).

As can be seen, the selection screening 220 may be performed by the buyer either before and/or after performing the loan affordability filtering 230. In addition, loan affordability filtering may be performed a number of times before a buyer selects goods for purchase. For example, after loan affordability is performed once, a buyer may use post-selection screening to select a subset of affordable products, and then may decide to modify certain financial variables, such as down payment or loan term, and then perform loan affordability filtering again to see which of the subset of affordable products the buyer can still afford. This process may be repeated as desired by the buyer.

As mentioned above, in one embodiment, loan affordability filtering permits display of only those good(s) and/or service(s) that the buyer is qualified to finance. In another embodiment, loan affordability filtering permits displays of all selected good(s) and/or service(s), but indicates to the buyer those that the buyer is not qualified to finance. For example, those good(s) and/or service(s) for which financing cannot be secured may be highlighted or printed in a pre-determined color, such as red, for example. Those good(s) and/or service(s) for which the buyer is qualified to finance may similarly be highlighted or printed in another pre-determined color, such as green, for example. In addition, a third category may also be used. Specifically, for example, "borderline" good(s) and/or service(s) may be highlighted or printed in a third pre-determined color, such as yellow, for example. A third category as such may represent those good(s) and/or service(s) that the buyer could potentially finance if the buyer were to change one or more loan parameters, such as, for example, increasing the buyer's down payment or reducing a certain amount of the buyer's pre-existing debt. In any case, any number of ways to indicate loan affordability filtering results are possible, and are included within the scope of the invention.

Figure 3:
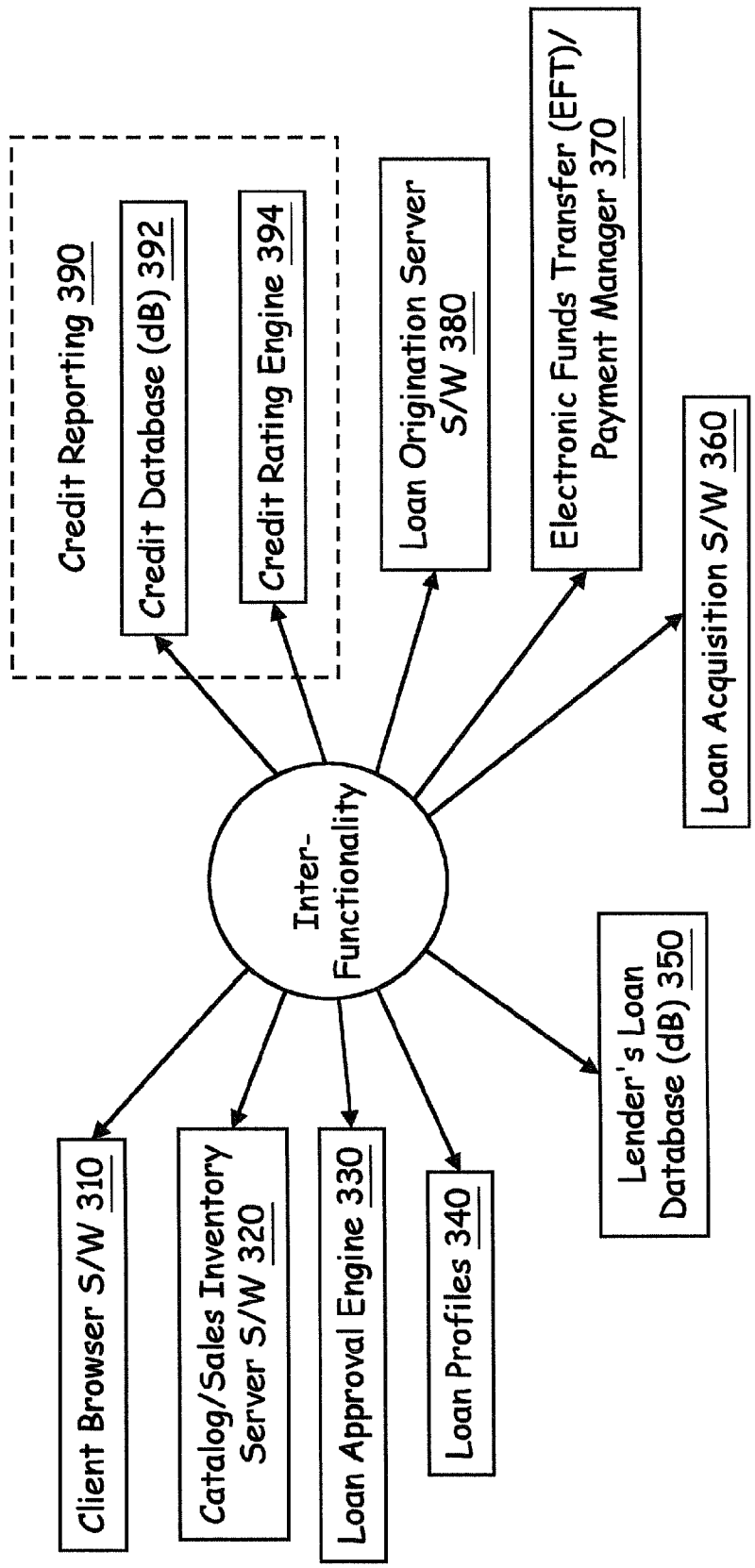
FIG. 3 is a functional diagram illustrating the interaction of various components of the online, affordability-based purchasing system of FIGS. 1 and 2.

FIG. 3 is a functional diagram illustrating the interaction of various components of the online, affordability-based purchasing system of FIGS. 1 and 2. The online, affordability-based purchasing system includes client browser software (S/W) 310 that is used by a client, such as a buyer, lender or seller, for example, to interact with the other components or the system. For example, using the client browser software (S/W) 310, a client may interact with catalog/sales inventory server software (S/W) 320 to access what good(s) and/or service(s) are available from any number of providers of good(s) and/or service(s) in accordance with any of the various embodiments of the invention. Similarly, a client may interact with loan acquisition software (S/W) 360 and loan origination server software (S/W) 380 to perform loan acquisition and loan origination, respectively.

The system also includes a loan approval engine 330 that determines whether the buyer qualifies for financing to assist in any purchase, and in the event the buyer does qualify for financing, determines the amount and degree of financing for which the buyer is qualified. To perform these determinations, the loan approval engine 330 uses, among other things, multiple loan profiles 340 and a lender's loan database (dB) 350. The loan approval engine 330 is operable to perform loan approval analysis for the buyer on a good and/or service basis.

In addition, the loan approval engine 330 is operable to perform loan approval analysis for a buyer on a category basis. More particularly, various categories of products typically have different qualifications standards. For example, different parameters are considered to qualify a buyer for a home purchase, as compared to those considered to qualify a buyer for an automobile purchase, as compared to those considered to qualify a buyer for a consumer product purchase, and so on. The loan approval engine 330 is capable of performing different analyses as a function of the specific purchase for which financing is being sought and on a category basis.

The multiple loan profiles 340 correspond to the different loan profiles provided by various lenders, some or all of which are contained within the lender's loan database (dB) 350. In one embodiment, the multiple loan profiles 340 and the loan approval engine 330 are colocated. In another embodiment, they are located in different locations.

As mentioned above, to originate a loan using traditional approaches, a loan approval officer or seller must execute a large amount of paperwork and verify certain buyer related parameters (such as, for example, the employment of a buyer who seeks the loan) before the loan can be approved for that buyer. The loan origination server software (S/W) 380 is operative, in conjunction with the loan approval engine 330, the multiple loan profiles 340, and the lender's loan database (dB) 350, to perform automated loan approval. The loan origination server software 380 performs all of the processing and paperwork that is required to perform loan approval, and may also include buyer signature capture functionality. The automated system enables loan origination without the assistance of a loan approval officer, and enables an employee having lower qualifications to assist a buyer in interfacing with the system to secure financing for a purchase. In fact, the loan origination server software (S/W) 380 is operable to perform automated loan origination without the necessity of any employee whatsoever. In other words, a buyer may perform loan origination on his/her own, subject, of course, to verification by the lender/seller of information provided by the buyer.

As mentioned above, lenders may use the loan acquisition software 360 to analyze and purchase desirable loans. The loan origination acquisition software (S/W) 360 is further operable to transfer loans that a lender sells to the purchasing institutions.

The system also includes an electronic funds transfer (EFT)/payment manager 370 that is operable to coordinate with the buyer to repay a loan that is originated within the system through EFT from a buyer's account at a financial institution.

If desired, the system also provides a credit reporting function 390 that uses a credit database (dB) 392 and a credit rating engine 394. These components are used in performing credit analysis, as described above. These components may also be implemented to perform anonymous credit reporting for the buyer. A buyer has the option of determining if he/she is qualified for a loan, and in the event the buyer is not qualified, the system does not issue a negative credit report (a rejection) against the buyer's credit record.

Figure 4:
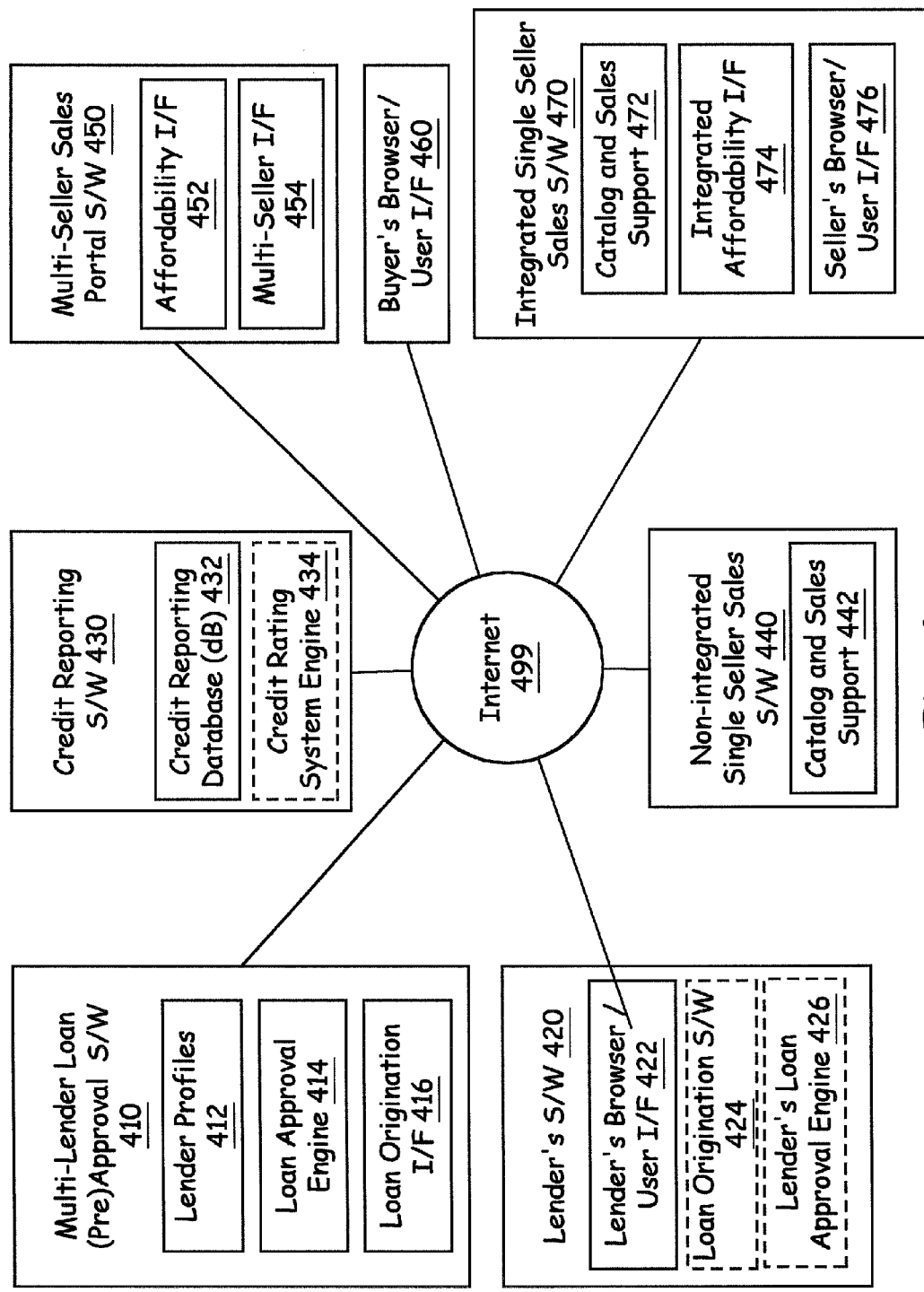
FIG. 4 is a system diagram illustrating another embodiment of the online, affordability-based purchasing system of FIG. 1.

FIG. 4 is a system diagram illustrating another embodiment of the online, affordability-based purchasing system of FIG. 1. Multi-lender loan (pre)approval software (S/W) 410, lender's software (S/W) 420, credit reporting software (S/W) 430, non-integrated single seller sales software (S/W) 440, multi-sales portal software (S/W) 450, and integrated single seller sales software (S/W) 470 all interconnect to the internet 499. A buyer can access all of the softwares (S/Ws) 410, 420, 430, 440, 450, and 470 using a buyer's browser/user interface (I/F) 460.

The multi-lender loan (pre)approval software (S/W) 410 itself may contain, among other components, multiple lender profiles 412, a loan approval engine 414, and a loan origination interface (I/F) 416. The multi-lender loan (pre)approval software (S/W) 410 is contained on a server connected to the Internet 499, in one embodiment of the invention. The multiple lender profiles 412 correspond to various loan providers who are integrated into the system. The loan approval engine 414 uses the multiple lender profiles 412 to perform pre-approval of a buyer's loan request for any of the multiple lenders who are integrated into the system. In one embodiment of the invention, the loan origination interface (V) 416 enables a buyer, lender or seller to pre-approve the buyer for loans of any lenders within the system.

The lender's software (S/W) 420 may contain, among other components, a lender's browser/user interface (I/F) 422, loan origination software (S/W) 424, and a lender's approval engine 426, in one embodiment of the invention. A lender's browser/user interface (I/F) 422 enables a lender to access, via the Internet 499, any of the other functionality within the system. If desired, the loan origination software (S/W) 424 and the lender's approval engine 426 may not be contained within the lender's software (S/W) 420. Parallel loan approval engines may also be included in various embodiments of the invention, as shown by the loan approval engine 414 and the lender's loan approval engine 426. If desired, the lender's software (S/W) 420 is operable to invoke the loan approval engine 414 via the Internet 499 when the lender's loan approval engine 426 is not contained within the lender's software (S/W) 420. Also, the loan origination interface (I/F) 416 and the loan origination software (S/W) 424 are operable in a parallel and cooperative manner as well, in that the loan origination interface (I/F) 416 may utilize the loan origination software (S/W) 424.

The credit reporting software (S/W) 430 may contain, among other components, a credit reporting database (dB) 432 and a credit rating system engine 434, in one embodiment of the invention. Alternatively, the credit rating system engine 434 may be located within other components in the system. For example, the functionality provided by the credit rating system engine 434 may be performed using one or both of the loan approval engine 414 and the lender's loan approval engine 426 when the credit rating system engine 434 is not included within the credit reporting software (S/W) 430.

The multi-seller sales portal 450 employs an affordability interface (I/F) 452 and a multi-seller interface (I/F) 454 to allow the buyer using the system to interact with other components within the system. The multi-seller sales portal 450 also allows any seller within the system to access other components within the system. For example, a seller within the system determines whether or not a buyer soliciting the seller qualifies for certain financing as provided by any lender participating within the system for any of the good(s) and/or service(s) offered by the seller.

The non-integrated single seller sales software (S/W) 440 may contain, among other things, a catalog and sales support function 442. The non-integrated single seller sales software (S/W) 440 is operable to perform framing on non-integrated single sellers as requested by a buyer using the system. For example, framing allows one web page to "frame" the contents of another web page. If desired, the non-integrated single seller sales software (S/W) 440 surrounds the framed web page with other information as desired by the various other functional blocks within the system. For example, a seller frames his own information such as the inventory of his own good(s) and/or service(s) using the non-integrated single seller sales software (S/W) 440. The framing performed in accordance with the present invention may be either dumb or intelligent. Intelligent framing extracts information from the non-integrated single seller sales web site and processes that information, while the dumb framing simply displays the information from the non-integrated single seller sales web site.

The integrated single seller sales software (S/W) 470 may contain, among other things, a catalog and sales support function 472, an integrated affordability interface (I/F) 474, and a seller's browser/user interface (I/F) 476. The catalog and sales support function 472 enables the integrated single seller to provide to a potential buyer access to all of the good(s) and/or service(s) within his inventory to a potential buyer. The integrated affordability interface (I/F) 474 allows a user of the system to perform affordability analysis for one or all of the integrated sellers coupled to the system. The seller's browser/user interface (I/F) 476 enables, like many of the other browser/user interfaces within the various embodiments of the invention, individual sellers or buyers can access via the internet all of the functionality provided by the various components within the system.

In the system of FIG. 4, a buyer may use the buyer's browser to access the multi-seller sales portal software 450. The buyer may then use the multi-seller interface 454 to view various products of multiple sellers, including integrated (i.e., participating) sellers, such as that represented by the integrated single seller sales software 470, and non-integrated (i.e., nonparticipating) sellers, such as that represented by the non-integrated single seller sales software 440. In the former case, the buyer is able to view products that are within the inventories of the sellers and are available for purchase. In the latter, the buyer is only able to view products that are listed on the sellers' website, which products may or may not be available for purchase, depending upon how up to date the sellers' websites are relative to their actual inventories.

In either case, the seller may then perform affordability analysis via the affordability interface 452 for all or a selected portion of the products, as mentioned above. In this situation, the multi-seller sales portal 450 may access, via the loan origination interface 416, the multi-lender loan (pre)approval software 410 to perform the analysis with multiple loans. The loan approval engine 414 uses the lender profiles 412, information provided by the buyer, and the credit reporting software 430 to determine the loans that are applicable for the selected product(s). Specifically, the loan approval engine 414 accesses the credit reporting software 430, which may be that of a third party credit agency, to obtain buyer credit information from the credit reporting database 432. Alternatively, the credit approval engine 414 simply obtains a credit rating for the buyer calculated by the credit rating system engine 434. In either case, the loan approval engine 414 uses the information obtained, as well as information provided by the buyer and the lender profiles 412, to determine whether the buyer qualifies to purchase the selected product for each of the multiple lenders' loans, as discussed above.

In another embodiment, the multi-lender loan (pre)approval software 410 accesses the systems of multiple lenders, which systems themselves perform the loan approval. For example, the lender's software 420 may perform such an analysis using the lender's loan approval engine 426, similarly as discussed above. In either case, the results of the analysis are communicated for display to the buyer.

Of course, the functionality of the multi-seller sales portal software 450 and that of the multi-lender loan (pre)approval software 410 may be incorporated into a single component within the system.

The multi-seller sales portal 450 may instead (or additionally), at the buyer's request, for example, access a single lender, such as that represented by the lender's software 420, to perform the analysis with the loan(s) of a single lender. In this situation, loan approval may be performed, similarly as discussed above, by the lender's system, such as that represented by the lender's software 420. The lender uses its current loan profiles, information provided by the buyer, and information obtained from the credit reporting software 430, as discussed above, to determine loan approval. Again, the information is communicated for display to the buyer.

At this point, the buyer may select a product and a loan, and complete the purchase via the buyer's browser/user interface 460. For example, if the buyer selects a loan via the multi-lender loan (pre)approval software 410, the loan origination interface 416 accesses loan origination software of the selected lender, such as the loan origination software 424. The loan origination software 424 provides to the buyer for completion via the buyer's browser/user interface 460, all the necessary financing forms, etc., and even provides for buyer signature capture. Thus, using the system of FIG. 4, a buyer can complete a financed purchase without the assistance of a seller or lender, subject to confirmation of the financial information provided by the buyer.

Alternatively, after the buyer performs affordability analysis on the buyer's browser/user interface 460, the buyer may suspend the transaction session, and proceed to a seller or sellers to view product(s) of interest. The system saves the buyer's profile information and affordability analysis results, so that the buyer may have a seller simply pull up the information on the seller's browser, such as the seller's browser/user interface 476, to view and discuss product(s) or loan(s) of interest, a specific product or loan pre-selected by the buyer via the buyer's browser/user interface 460, or even the products of another seller. The buyer may then, with the assistance of the seller via the seller's browser/user interface 476, select a product(s) for purchase and a loan(s) (or confirm previous selections) and complete the transaction. Again, the system provides for completion by the buyer and/or seller via the seller's browser/user interface 476 all the necessary financing forms, etc., eliminating the time-consuming paperwork that sellers must often undertake to complete a sale involving financing, particularly when sellers typically deal with multiple lenders and have different paperwork for each.

Instead of proceeding to a seller, the buyer may instead (or additionally) proceed to a lender or lenders to discuss financing options and continue the transaction session. The buyer may have a lender simply pull up the information on the lender's browser, such as the lender's browser user interface 422, to view and discuss loans or product(s) of interest, a specific loan or product pre-selected by the buyer via the buyer's browser/user interface 460, or even the loans of another lender. Similarly as above with respect to the seller, the buyer may, this time with the assistance of the lender via the lender's browser user interface 422, select a product(s) for purchase and a loan (or confirm previous selections) and complete the transaction. Once again, the system provides for completion by the buyer and/or lender via the lender's browser/user interface 422 all the necessary financing forms, etc.

A buyer may also start the whole process without ever using the buyer's browser/user interface 460. In other words, the buyer may proceed directly to a seller and/or lender to initiate a transaction session. In this case, the seller/lender may access the multi-seller sales portal software 450 and/or the multi-lender loan (pre)approval software 410 and assist the buyer in entering the buyer's financial information and perform affordability analysis via their respective browsers/user interfaces.

Figure 5:
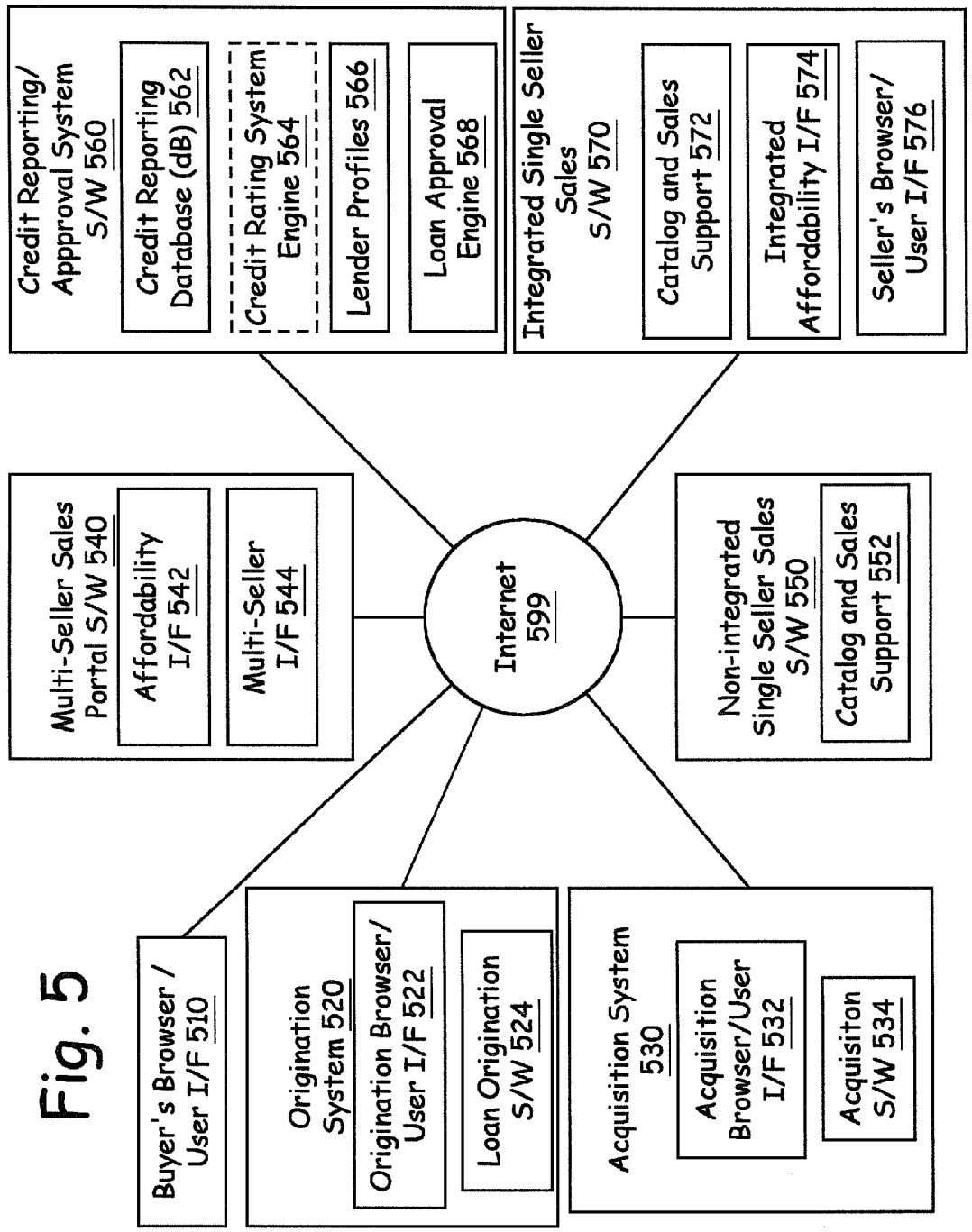
FIG. 5 is a system diagram illustrating a further embodiment of the online, affordability-based purchasing system of FIG. 1.

FIG. 5 is a system diagram illustrating a further embodiment of the online, affordability-based purchasing system of FIG. 1. An origination system 520, an acquisition system 530, a multi-seller sales portal software (S/W) 540, a non-integrated single seller sales software (S/W) 550, a credit reporting/approval system software (S/W) 560, and an integrated single seller sales software (S/W) 570 all interconnect to the internet 599. A buyer can access all of the functionality of FIG. 5 using a buyer's browser/user interface (I/F) 510.

The origination system 520 may contain, among other things, an origination browser/user interface (I/F) 522 and a loan origination software (S/W) 524. The acquisition system 530 may contain, among other things, an acquisition browser/user interface (I/F) 532 and an acquisition software (S/W) 534. The multi-seller sales portal software (S/W) 540 may contain, among other things, an affordability interface (I/F) 542 and a multi-seller interface (I/F) 544. The credit reporting/approval system software (S/W) 560 may contain, among other things, a credit reporting database (dB) 562, multiple lender profiles 566, a loan approval engine 568 and a credit rating system engine 564 in certain embodiments of the invention. The non-integrated single seller sales software (S/W) 550 performs, among other things, a catalog and sales support function 552. The integrated single seller sales software (S/W) 570 performs, among other things, a catalog and sales support function 572 and contains, among other things, an integrated affordability interface (I/F) 574 and a seller's browser 576. The functionality of the components in FIG. 5 may be similar to that discussed above with respect to earlier figures.

The origination system 520 operates with any number of existing lenders integrated into the system. For example, certain lenders target and seek certain risk profiles representative of a certain class of buyers. In addition, the origination system 520 eliminates the paperwork that is typically executed to perform loan processing. The origination system 520 may wait for verification of certain parameters provided by a buyer, such as verification of employment information. The acquisition system 530 is operable to purchase loans from the origination system 520. The credit reporting/approval system software (S/W) 560 may be a single software system or a distributed software system. In addition, the credit reporting/approval system software (S/W) 560 is operable to generate anonymous credit reports for various users of the system. The credit reporting/approval system software (S/W) 560 is also operable to determine the maximum value of a loan for which a buyer is approved. The multi-seller sales portal software (S/W) 540 is operable to use the maximum loan value for which a buyer is qualified and beat that maximum loan value against an inventory of good(s) and/or service(s) for a seller or a selected number of sellers to determine which of those good(s) and/or service(s) the buyer can afford to finance.

In addition, a selected number of good(s) and/or service(s) are provided to the system, and the credit reporting/approval system software (S/W) 560 is operable to perform different credit analysis as a function of the item for which the loan is being sought. For example, depending on whether the loan is being sought to purchase an automobile, a home, or to repay revolving credit, the credit reporting/approval system software (S/W) 560 is operable to accommodate the different manner in which parameters corresponding to the buyer are handled.

The non-integrated single seller sales software (S/W) 550 is operable to perform framing on non-integrated single sellers as requested by a buyer using the system. For example, framing allows one web page to "frame" the contents of another web page. If desired, the non-integrated single seller sales software (S/W) 550 surrounds the framed web page with other information, as desired, by the various other functional blocks within the system. For example, a seller frames his own information, such as the inventory of his own good(s) and/or service(s), using the non-integrated single seller sales software (S/W) 550. The framing performed in accordance with the present invention may be either dumb or intelligent. Intelligent framing extracts information from the non-integrated single seller sales web site and processes that provided information, while the dumb framing simply displays the information from the non-integrated single seller sales web site.

In the system of FIG. 5, a buyer may use the buyer's browser to access the multi-seller sales portal software 540. The buyer may then use the multi-seller interface 544 to view various products of multiple sellers, including integrated (i.e., participating) sellers, such as that represented by the integrated single seller sales software 570, and non-integrated (i.e., nonparticipating) sellers, such as that represented by the non-integrated single seller sales software 550. In the former case, as mentioned above with respect to FIG. 4, the buyer is able to view products that are within the inventories of the sellers and are available for purchase. In the latter, the buyer is only able to view products that are listed on the sellers website, which products may or may not be available for purchase, depending upon how up to date the sellers' websites are relative to their actual inventories.

In either case, the seller may then perform affordability analysis via the affordability interface 542 for all or a selected portion of the products, as mentioned above. In this situation, the multi-seller sales portal software 540 may access, via the affordability interface 542, the credit reporting/approval system software 560 to perform the analysis with multiple loans. The loan approval engine 568 uses the lender profiles 566, information provided by the buyer, and the credit reporting database 562 to determine the loans that are applicable for the selected product(s). Specifically, the loan approval engine 568 accesses the credit reporting database 562, to obtain buyer credit information. Alternatively, the loan approval engine 568 simply obtains a credit rating for the buyer calculated by the credit rating system engine 564, which may be part of the credit reporting approval system software 560 or part of the system of a third-party credit agency. In either case, the loan approval engine 568 uses the information obtained, as well as information provided by the buyer and the lender profiles 566, to determine whether the buyer qualifies to purchase the selected product for each of the multiple lenders' loans, as discussed above. The results of the analysis, i.e., the product(s) that the buyer can finance and the loans applicable to each, are communicated to the buyer for display.

At this point, the buyer may select a product and a loan, and complete the purchase via the buyer's browser/user interface 510. If the buyer selects a loan, the buyer may access loan origination software of the selected lender. Specifically, for example, the buyer may access, via the origination browser/user interface 522, the loan origination software 524 in the origination system 520. The loan origination software 524 provides to the buyer for completion via the buyer's browser/user interface 510, all the necessary financing forms, etc., and provides for buyer signature capture, similarly as discussed above.

The origination system 520 may be that of a single lender or part of a separate system that services multiple lenders. In addition, the functionality of the origination system 520, the multi-seller sales portal 540, and the credit reporting/approval system software 560 may be combined into one or two components within the system.

After the buyer performs affordability analysis via the buyer's browser/user interface 510, the buyer may suspend the transaction session, and proceed to a seller or sellers to view product(s) of interest. The system saves the buyer's profile information and affordability analysis results, so that the buyer may have a seller simply pull up the information on the seller's browser, such as the seller's browser/user interface 576, to view and discuss product(s) or loan(s) of interest, a specific product or loan pre-selected by the buyer via the buyer's browser/user interface 510, or even the products of another seller. The buyer may then, with the assistance of the seller via the seller's browser/user interface 576, select a product(s) for purchase and a loan(s) (or confirm previous selections) and complete the transaction. Again, the system provides for completion by the buyer and/or seller via the seller's browser/user interface 576 all the necessary financing forms, etc.

Also, as mentioned above, the buyer may initiate a transaction session by proceeding directly to a seller and/or lender to initiate a transaction session. For example, the seller/lender may, via their respective browsers/user interfaces, access the multi-seller sales portal software 540 and assist the buyer in entering the buyer's financial information and perform affordability analysis. Alternatively, the seller/lender may be integrated into the overall system, and be able to perform affordability analysis via their own systems, rather than through the multi-seller sales portal 540. Specifically, for example, the buyer may proceed to an integrated seller, such as that represented by the integrated single seller sales software 570, and perform affordability analysis using the seller's browser/user interface 576. In this situation, the seller, using the seller's browser/user interface 574 and via the seller's integrated affordability interface 574, accesses the credit reporting/approval system software 560, which performs the affordability analysis as discussed above.

Figure 6:
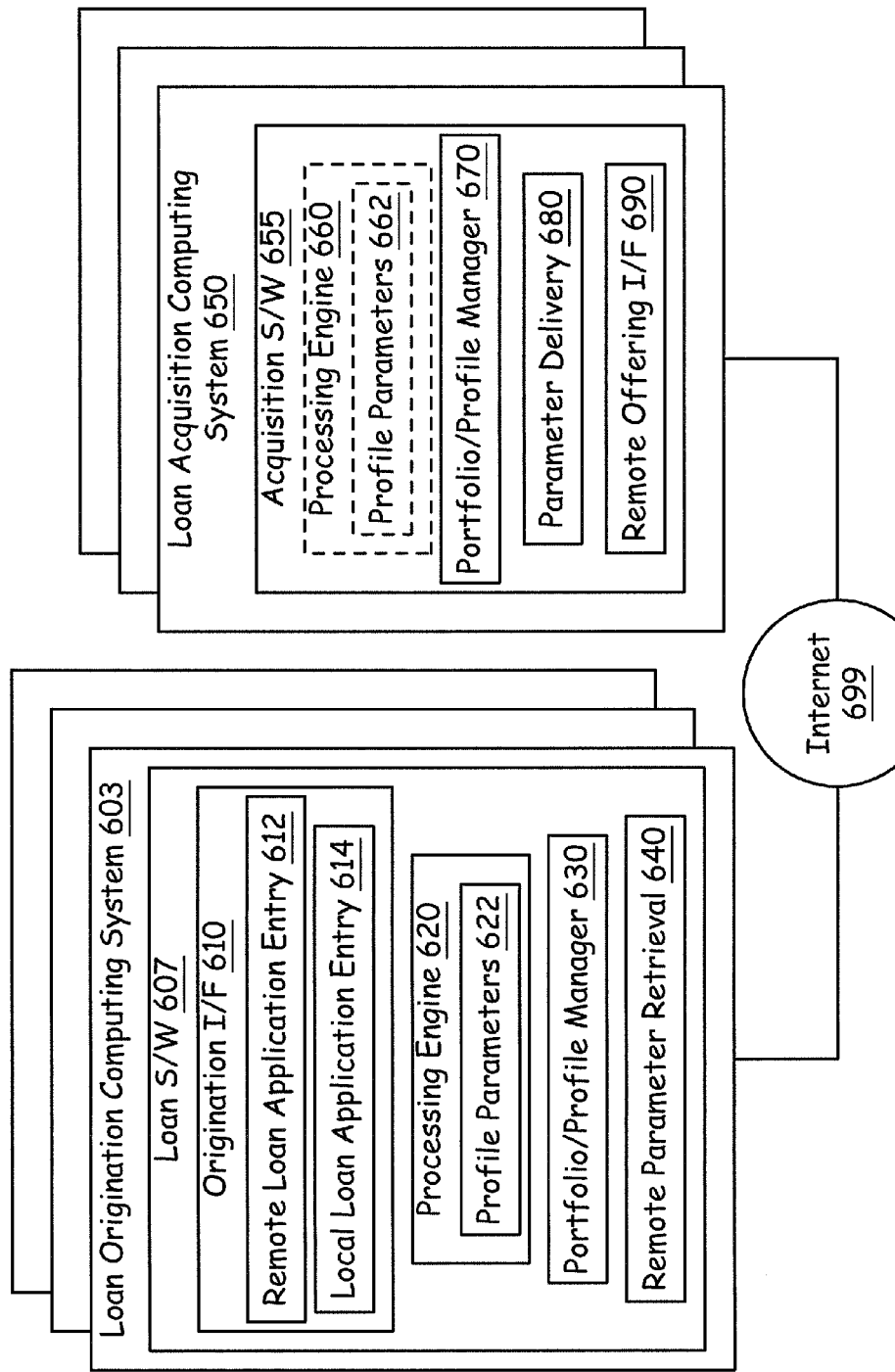
FIG. 6 is a system diagram illustrating an embodiment of a loan origination and acquisition system in accordance with the present invention, which may be a stand alone system or incorporated into the online, affordability-based purchasing system of the present invention.

FIG. 6 is a system diagram illustrating an embodiment of a loan origination and acquisition system in accordance with the present invention, which may be incorporated into the online, affordability-based purchasing system of the present invention, such as shown in FIG. 5 above, or may be a stand alone system. A loan origination computing system 603 and a loan acquisition computing system 650 both interconnect to the Internet 699. The loan origination system 603, as well as the loan acquisition computing system 650, may be part of a lender's system, part of a separate system accessed by the lender (or buyer or seller) via the lender's browser/user interface, or may each be a part of separate systems of different lenders.

The loan origination computing system 603 itself may contain, among other things, a loan software (S/W) 607. The loan software (S/W) 607 itself may contain, among other things, an origination interface (I/F) 610, a processing engine 620 having access to multiple profile parameters 622, a portfolio/profile manager 630, and a remote parameter retrieval function 640. The origination interface (I/F) 610 itself may contain, among other things, a remote loan application entry function 612 and a local loan application entry function 614.

The loan acquisition computing system 650 itself may contain, among other things, an acquisition software (S/W) 655. The acquisition software (S/W) 655 contains at least a portfolio/profile manager 670, a parameter delivery function 680, and a remote offering interface (I/F) 690. If desired, the acquisition software (S/W) 655 contains a processing engine 660 that employs multiple profile parameters 662. The processing engine 660 employing the multiple profile parameters 662 may be a parallel engine to the processing engine 620 employing the multiple profile parameters 622.

The system of FIG. 6 provides for evaluation of the risk of issuing a loan to a buyer after considering all of the parameters represented by the profile parameters 662, in such a way as to provide significant improvement over conventional methods that employ human employees who attempt to perform real time evaluation. The computer implementation of the invention does not limit the number of parameters that may be included in the risk evaluation that is performed for a specific buyer.

As mentioned above, the loan origination computing system 603 includes loan software 607 for analyzing risk and originating loans. The loan origination interface 610 enables remote loan application entry 612 via the browser/interface of other systems, and local loan application entry 614, if, for example, the loan origination computing system 603 is incorporated into a lender's system. The processing engine 620 uses the information provided via the origination interface 610 and the profile parameters 622 to evaluate whether the buyer should be approved for a loan, similarly as discussed above.

In addition, the processing engine 620 may likewise retrieve remote parameters via remote parameter retrieval 640 that are delivered by the loan acquisition computing system 650 via parameter delivery 680. The processing engine 620 may then use this information to determine whether or not to approve the buyer. In some cases as such, origination may depend, at least partially, on whether or not the loan fits within parameters of loans previously purchased by the lender or some other entity, or those that the lender or other entity has been successful in selling in the past. This information may be generated/maintained by the portfolio/profile manager 670.

The loan software 607 may also include a portfolio/profile manager 630. The manager 630 keeps track of the portfolio of loans, and their respective profiles and buyer information, being carried by the lender, which information may also be considered in evaluating the relative risks of issuing a loan to a particular buyer. If, for example, the buyer's financial condition and loan requested matches those of others within the lender's portfolio that are deemed desirable (e.g., low risk) by the lender, the lender may consider this information in determining approval or the amount the lender is willing to finance.

The information may also be used to determine whether or not a lender should sell any loan being carried by the lender. If the lender approves a buyer for a loan, or previously acquired that loan, the portfolio/profile manager 630 may evaluate that buyer/loan relative to others within the lender's portfolio to evaluate the relative risks of continuing to carry that loan. If the manager 630 determines that the risk is too high, it may designate the loan as one that should be sold by the lender. The manager 630 may also evaluate loans within the lender's portfolio, and use loan history to modify the profile parameters used by the lender, as necessary, in order to lower risk or increase origination while maintaining low risk.

The loan acquisition computing system 650 includes acquisition software 655 that may be used by a lender (or other entity) to acquire loans deemed desirable and to sell loans deemed undesirable. The acquisition software 655 includes a portfolio/profile manager 670 that keeps track of the portfolio of loans, and their respective profiles and buyer information, being carried by the lender, which information may be considered in evaluating the relative risks of acquiring certain loans and desirability of selling certain loans.

The acquisition software 655 also includes a remote offering interface 690 for sending or receiving loan acquisition offers. For example, the acquisition software 650 may receive, in response to a request or otherwise, an offer to sell a particular loan. The acquisition software 655 may include a processing engine 660 that uses profile parameters 622, and, if desired, information generated/maintained by the portfolio/profile manager 670 to analyze relative risks and determine whether the offered loan is approved for acquisition. Alternatively, the acquisition software 655 uses information generated by a remote processing engine, such as processing engine 620, and/or information generated/maintained by the portfolio/profile manager 670, to analyze relative risks and determine whether the offered loan is approved for acquisition.

The loan acquisition software 655 may also communicate, via the remote offering interface 690, a request to acquire certain loans. The acquisition software 655 delivers the required parameters via parameter delivery 680 to, for example, the loan origination computing system 603, which retrieves the parameters via remote parameter retrieval 640 and uses the parameters retrieved to determine whether or not any of the loans in the profile meet those parameters. If at least one does, and the loan origination computing system 603 desires to sell the identified loan(s), the loan acquisition computing system 650 completes the transaction with the loan origination computing system 603, assuming the terms of sale are otherwise acceptable.

In addition, the system of FIG. 6 enables a user (e.g., a buyer, lender or seller) to define an interest rate, decide whether to increase or decrease a down payment, or to increase or decrease the number of months of the term of the loan, among other parameters, dealing with the approval of the loan for a buyer. This allows for intelligent advising, where suggestions are made to the buyer to assist the buyer in determining what loan parameters should be changed so that the buyer can qualify for a loan having a larger maximum ceiling. For example, in certain cases, the re-payment of a predetermined amount of a buyer's existing revolving debt will significantly increase the maximum loan for which the buyer will qualify.

Figure 7:
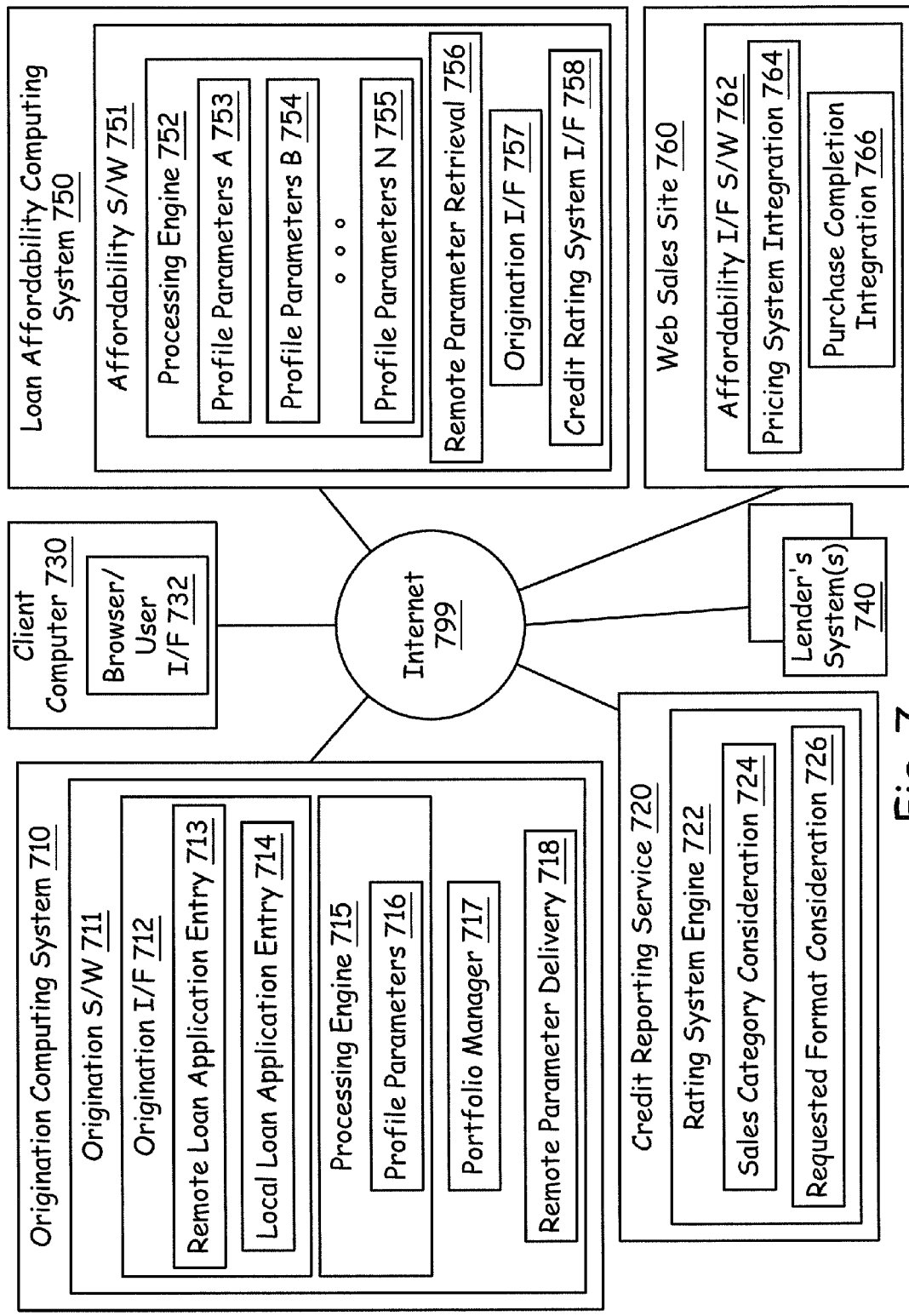
FIG. 7 is a system diagram illustrating yet another embodiment of the online affordability-based purchasing system of FIG. 1.

FIG. 7 is a system diagram illustrating yet another embodiment of the online affordability-based purchasing system of FIG. 1. An origination computing system 710, a credit reporting service 720, a single or multiple lender's system(s) 740, a loan affordability computing system 750, and a the web sales site 760 all interconnect to the internet 799. A client using the system can access all of the components of the system using a browser/user interface (I/F) 732, which may be contained within, for example, a client computer 730.

The origination computing system 710 may contain, among other things, an origination software (S/W) 711. The origination software (S/W) 711 may contain, among other things, an origination interface (I/F) 712, a processing engine 715, a portfolio manager 717, and a remote parameter delivery function 718. The origination interface (I/F) 712 itself may perform, among other functions, a remote loan application entry function 713 and a local loan application entry function 714. The processing engine 715 itself may contain, among other things, multiple profile parameters 716. The credit reporting service 720 itself may contain, among other things, a rating system engine 722. The rating system engine 722 itself may perform, among other functions, a sales category consideration function 724 and a requested format consideration function 726. The origination computing system 710 may have the same or similar functionality as the loan origination computing system 603 of FIG. 6.

The loan affordability computing system 750 itself may contain, among other things, an affordability software (S/W) 751. The affordability software (S/W) 751 itself may contain, among other things, a processing engine 752, an origination interface (I/F) 757, and a credit rating system interface (I/F) 758. The affordability software (S/W) 751 itself may perform, among other functions, a remote parameter retrieval function 756. The processing engine 752 itself may contain, among other things, multiple profile parameters A 753, multiple profile parameters B 754, and multiple profile parameters N 755. The web sales site 760 itself may contain, among other things, an affordability interface (I/F) software (S/W) 762. The affordability interface (I/F) software (S/W) 762 itself may perform, among other things, a pricing system integration function 764 and a purchase completion integration function 766.

The interconnection between the credit reporting service 720 and the Internet 799 may be a low bandwidth connection in certain embodiments of the invention. The credit reporting service 720 may generate a specific type of report or rating, using the sales category consideration 724 component of the credit rating engine 722, pertaining to the type of good(s) and/or service(s) for which financing is sought. For example, the credit reporting service 720 can handle different types of good(s) and/or service(s) in different manners to ensure that the maximum loan value for those specific good(s) and/or service(s) is found. When dealing with different good(s) and/or service(s), such as an automobile or a home, or with repayment of revolving credit, the credit reporting/service 720 is operable to accommodate the different manner in which parameters corresponding to the buyer are entered.

In addition, the credit reporting service 720 may provide for anonymity in the loan approval process. When a buyer uses conventional methods employed in purchasing good(s) and/or service(s), such as automobiles, whenever a loan analysis is performed wherein the buyer is denied financing, the buyer receives an undesirable rejection on his personal credit history. If a buyer goes from one provider of good(s) and/or service(s) to another and the buyer is continually rejected for financing, the buyer's personal credit history can be significantly compromised. In response to the requested format consideration 726 component, the credit reporting service 720 may provide to the buyer multiple, anonymous credit reports, if so requested by the buyer. In addition, a full credit report is sent to a seller's system, as shown in the various embodiments of the system, but only after the buyer's loan has been approved.

In addition the credit reporting service 720 may, in response to the requested format consideration 726 component, generate only a credit rating and nothing else, if requested by the client. For example, the credit reporting service 720 does not generate a large file having all of the buyer's account information listed. Rather, the credit reporting service 720 generates only a single value indicative of the buyer's credit rating. This reduction of information provides for a significant savings of bandwidth within the system.

In the system of FIG. 7, a client, such as a buyer, for example, uses the browser/user interface 732 of client computer 730 to access a web sales site 760 of a single seller or one that interfaces with multiple sellers. The buyer can view products and then select a product or products to perform an affordability analysis. The buyer may, for example, select a button or icon on the web sales site 760, which vectors the buyer to the loan affordability computing system 750. The buyer then uses the affordability software 751 and information provided via the affordability interface software 762 to perform affordability analysis, as discussed above.

For example, the processing engine 752 may access the credit reporting service 720, via the credit rating system interface 758, to obtain a buyer credit rating. The processing engine 752 then uses the credit rating obtained, pricing information from pricing system integration 764 component, and the profile parameters of multiple lenders stored in memory, for example, to determine the product(s) that the buyer qualifies to purchase and the loan(s) applicable to each. The processing engine 752 may also retrieve, via the remote parameter retrieval 756 component, remote parameters of other lenders, which parameters may be located in the origination computing system 710 or the lender's system(s) 740, to consider the loans of those lenders in the analysis. The remote parameter retrieval 756 component may also be used to obtain updated parameter information from multiple lenders so that the loan affordability computing system 750 may update the multiple profile parameters used by the processing engine 752. In either case, the remote parameter retrieval 756 component may interface with a remote parameter delivery component, such as remote parameter delivery 718 component of origination computing system 710 or that of the lender's system(s) 740.

Once the buyer performs the affordability analysis, the buyer may select a product and a loan, and complete the purchase. The affordability software 751 may access the origination computing system 710 via the origination interface 757, and the origination computing system 710 may originate the loan, similarly as discussed above. The web sales site 760 includes purchase completion integration 766 so that the buyer can purchase the selected product from the web sales site 760, using the loan originated via the loan affordability computing system 750.

Figure 8:
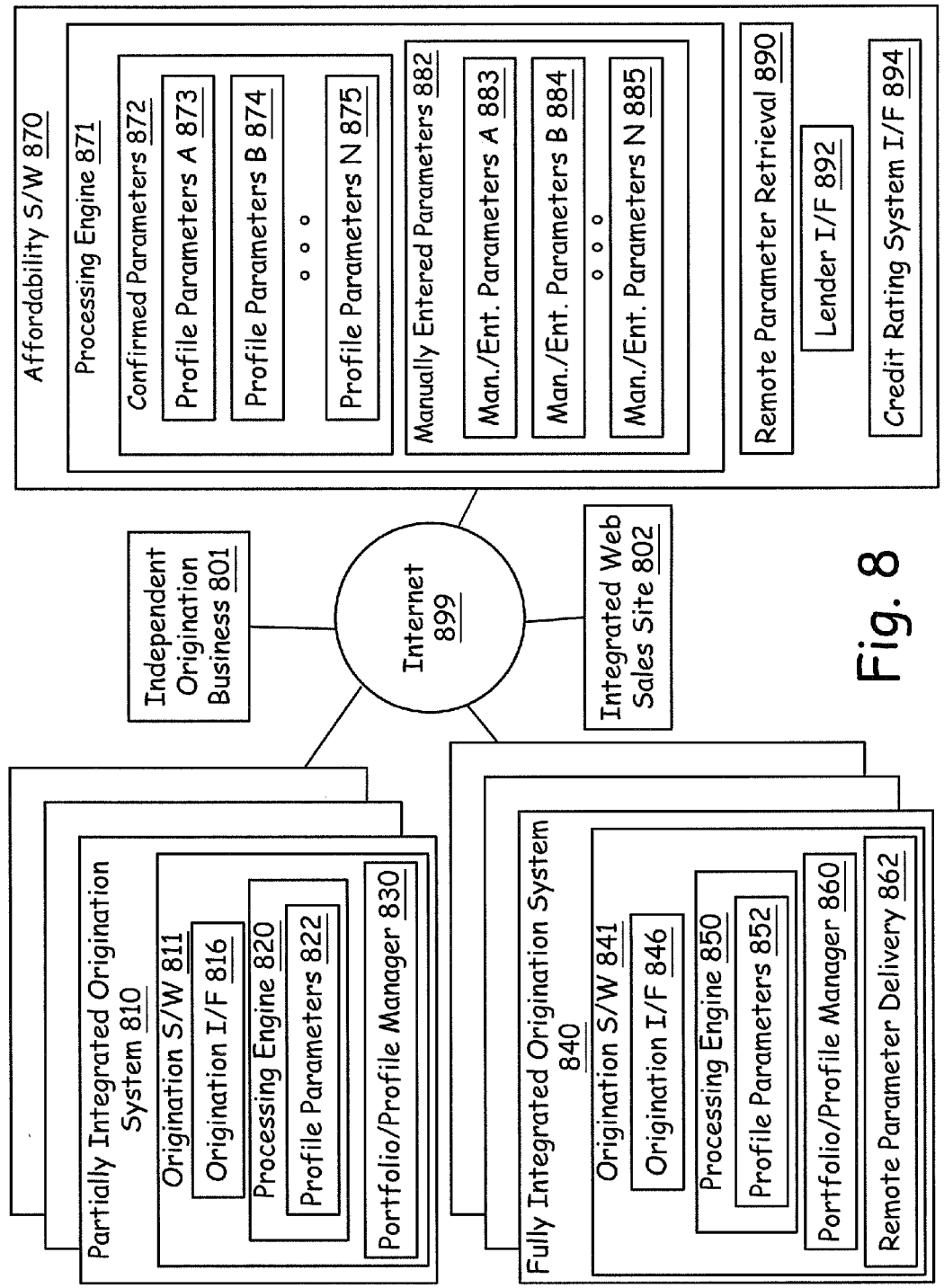
FIG. 8 is a system diagram illustrating a still further embodiment of the online, affordability-based purchasing system of FIG. 1.

FIG. 8 is a system diagram illustrating a still further embodiment of the online, affordability-based purchasing system of FIG. 1. The system of FIG. 8 illustrates one embodiment of the invention wherein certain lenders need not necessarily directly participate with the system, yet their information is nevertheless provided to a user. A partially integrated origination system 810, an independent origination business 801, a fully integrated origination system 840, an integrated web sales site 802, and an affordability software (S/W) 870 all interconnect to the Internet 899.

The partially integrated origination system 810 itself may contain, among other things, an origination software (S/W) 811. The origination software (S/W) 811 itself may contain, among other things, an origination interface (I/F) 816, a processing engine 820, and a portfolio/profile manager 830. The processing engine 820 itself may contain, among other things, multiple profile parameters 822.

The fully integrated origination system 840 itself may contain, among other things, an origination software (S/W) 841. The origination software (S/W) 841 itself may contain, among other things, an origination interface (I/F) 846, a processing engine 850 having multiple profile parameters 852, a portfolio/profile manager 860, and a remote parameter delivery function 862. The affordability software (S/W) 870 itself may contain, among other things, a processing engine 871, a lender interface (I/F) 892, that may perform, among other things, a remote parameter retrieval function 890, and a credit rating system interface (I/F) 894.

The processing engine 871 utilizes confirmed parameters 872 and manually entered parameters 882. The confirmed parameters 872 contains multiple profiles, as illustrated by multiple profile parameters A 873, multiple profile parameters B 874, and multiple profile parameters N 875, corresponding to different lenders integrated into the system, such as, for example, that represented by fully integrated origination system 840. The parameters of integrated systems as such may be delivered remotely, via a remote parameter delivery function, such as remote parameter delivery 862 function of system 840. The affordability software 870 uses the parameters delivered to update the confirmed parameters 872. The affordability software 870 may also retrieve such parameters, via the remote parameter retrieval 890 function, and similarly update the confirmed parameters 872. Since the confirmed parameters are those of integrated lenders, they do not need separate confirmation before loan origination.

The manually entered parameters 882, illustrated by manually entered parameters A 883, manually entered parameters B 884, and manually entered parameters N 885, are those of nonintegrated lenders, which parameters are manually entered. Parameters as such should be confirmed with the relevant lender before loan origination to determine whether they are still valid.

The independent origination business 801 is illustrative of one business, which may also be a provider of good(s) and/or service(s), that is not directly integrated nor participating in the system. The parameters for such an independent origination business may be added manually to the system. The integrated web sales site 802 is illustrative of a business that is fully integrated, or participating, in the system. A client may therefore access the affordability software 870 via the integrated web sales site 802.

The multiple profile parameters 822 within the processing engine 820 are pulled, not pushed. However, the multiple profile parameters 852 within the processing engine 850 are pushed within the system. The effects of any changes of the multiple profile parameters 852 within the processing engine 850 take effect immediately due to the full integration of the fully integrated origination system 840. The confirmed parameters 872 within the affordability software (S/W) 870 are confirmed to be exactly those parameters corresponding to various lenders. The manually entered parameters 882 within the affordability software (S/W) 870 are entered manually after verifying, if desired, that the parameters are actually indicative and representative of the parameters provided by the various lenders cooperating with the system. Also, the processing engine 871 within the affordability software (S/W) 870 performs actual affordability analysis, and it is operable to perform estimated affordability analysis wherein a full credit report is not generated if not all of the parameters are available.

Figure 9:
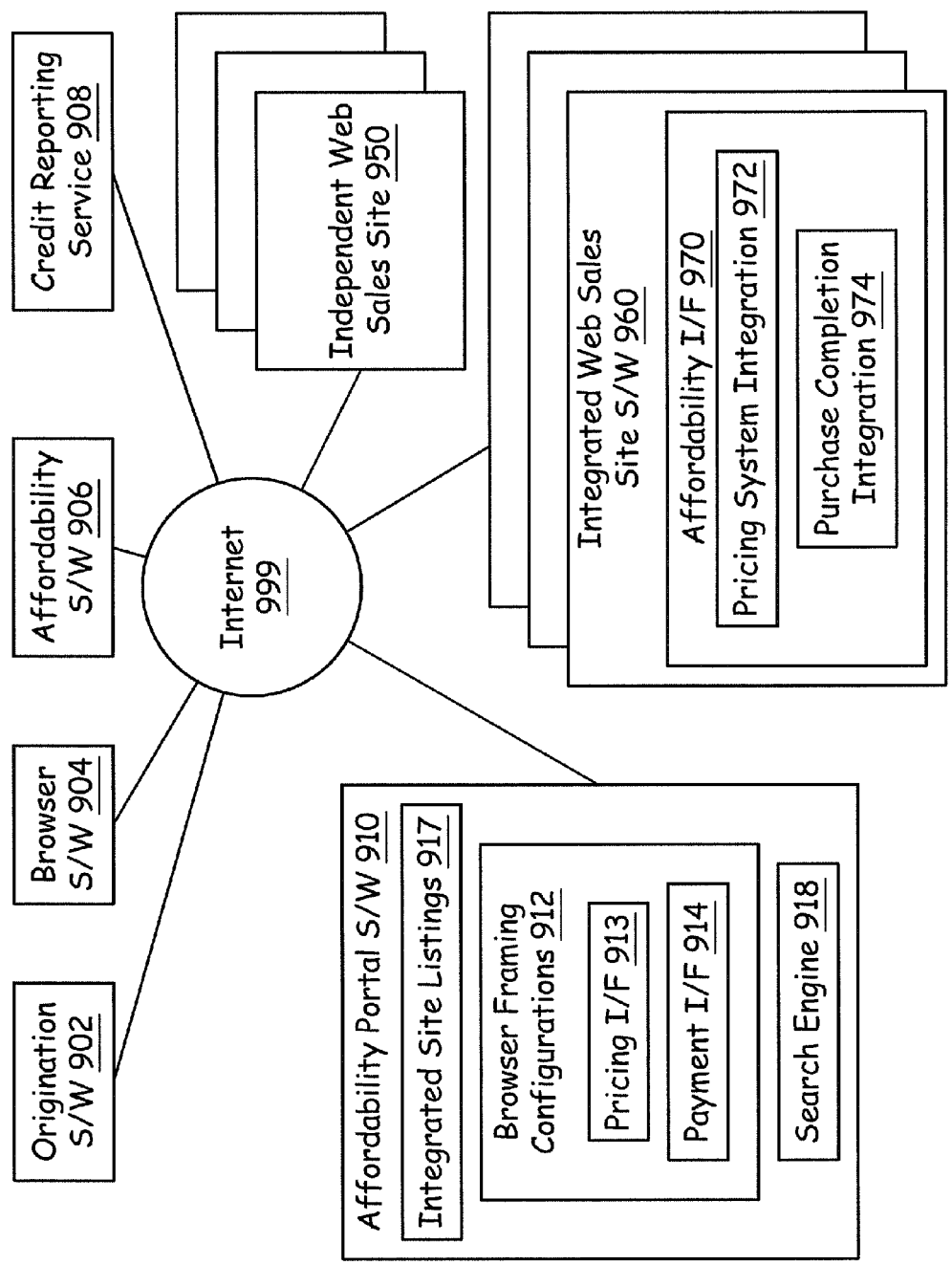
FIG. 9 is a system diagram illustrating another embodiment of the online, affordability-based purchasing system of FIG. 1 that utilizes an affordability portal.

FIG. 9 is a system diagram illustrating another embodiment of the online, affordability-based purchasing system of FIG. 1 that utilizes an affordability portal. An origination software (S/W) 902, a browser software (S/W) 904, an affordability software (S/W) 906, a credit reporting service 908, a number of independent web sales sites 950, an affordability portal software (S/W) 910, and a number of integrated web sales site softwares (S/Ws) 960 all interconnect to the internet 999.

The affordability portal software (S/W) 910 itself may contain, among other things, a number of integrated site listings 917, a search engine 918, and a number of browser framing configurations 912 each having a pricing interface (I/F) 913 and a payment interface (I/F) 914. The integrated web sales site software (S/W) 960 itself may contain, among other things, an affordability interface (I/F) 970. The affordability interface (I/F) 970 may have, among other things, pricing system integration 972 and a purchase completion integration 974.

The affordability portal software (S/W) 910 is operable to serve as a front end for a number of different sellers. The affordability portal software (S/W) 910 serves to provide a buyer using the system, access to a number of different sellers providing various good(s) and/or service(s). The affordability portal software (S/W) 910 also is operable to perform framing for any of the various independent web sales sites 950. Again, the framing performed here may be intelligent or dumb. For example, the framing may extract information from certain of the various independent web sales sites 950, or may simply display the information provided from certain of the various independent web sales sites 950. The extracted information in the intelligent framing embodiments of the invention is used by the affordability software (S/W) 906 to perform analysis for loan approval and loan acquisition by a buyer using the system.

The origination software 902 affordability software 906 and the credit reporting service 908 may have the same functionality of similar components discussed above.

In the system of FIG. 9, a buyer may, via the buyer's browser software 904 access the affordability portal software 910, which contains integrated site listings 917. The buyer may access the integrated sites listed, or perform a search of all sites, integrated or independent, using the search engine 918.

When a buyer accesses an integrated site, such as that represented by the integrated web sales site software 960, the buyer may perform an affordability analysis using the affordability software 906. The affordability interface 970 enables pricing information to be accessed by the affordability software 906, and enables the purchase to be completed, via the affordability portal 910, if desired, using a loan originated via the origination software 902.

When a buyer desires to purchase a product from an independent web sales site 950, the affordability software 910 frames pricing and payment information, via the pricing interface 913 and payment interface 914, respectively. The pricing information obtained may be used to perform an affordability analysis using the affordability software 906.

The payment interface 914 may be used to complete a purchase of a product from the independent web sales site 950 via the affordability portal software 910.

Figure 10:
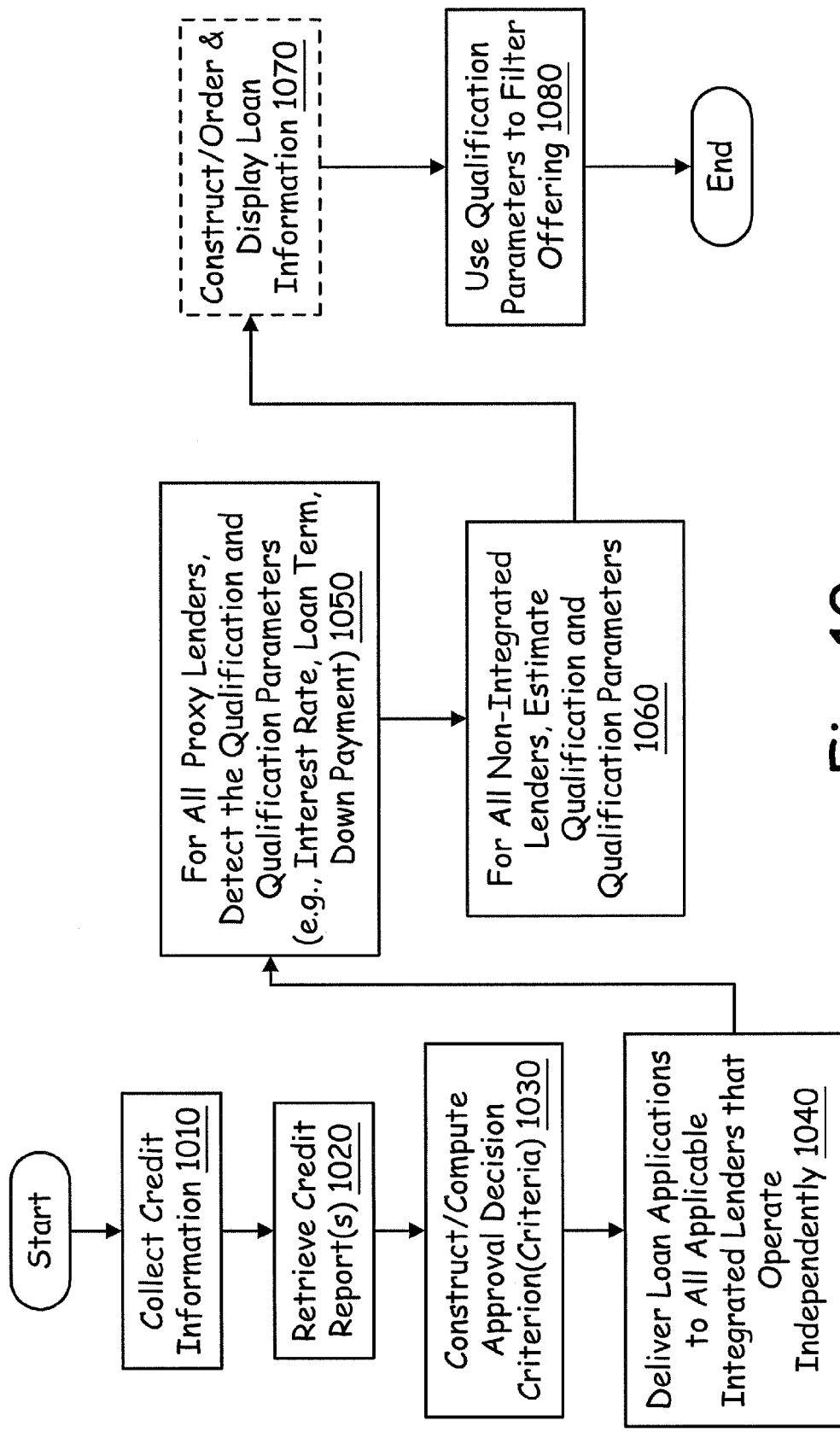
FIG. 10 is a functional block diagram illustrating one embodiment of online, affordability-based filtering performed in accordance with the present invention.

FIG. 10 is a functional block diagram illustrating one embodiment of online, affordability-based filtering performed in accordance with the present invention. In a block 1010, credit information is collected. Subsequently, in a block 1020, a predetermined number of credit reports are retrieved. The credit reports are contained within any of the locations for storage of credit reports in any of the various embodiments of the invention. Then, in a block 1030, an approval decision criterion is generated or constructed. If desired, multiple approval decision criteria may be generated or constructed in the block 1030. Then, in a block 1040, loan applications are delivered to all applicable integrated lenders that operate independently. Those integrated lenders that do not operate independently, but that operate within the system performing the method 1000, automatically receive loan applications corresponding to the buyer.

Then, in a block 1050, qualification and qualification parameters are detected for all proxy lenders. Examples of qualification parameters include interest rate of a loan, the term of a loan, and the down payment to be paid for the loan. For all of the lenders that are not integrated, the qualification and qualification parameters corresponding to those lenders are estimated in a block 1060. If desired, in a block 1070, the loan information is constructed/ordered and displayed to a buyer. Here, the system may display such information as whether the local area network is approved, the particular lenders from whom the buyer can secure financing, and other information pertaining to the securing of a loan for the buyer. Finally, in a block 1080, the qualification parameters that are either detected in the block 1050 or are estimated in the block 1060 are used to filter the offering.

Figure 11:
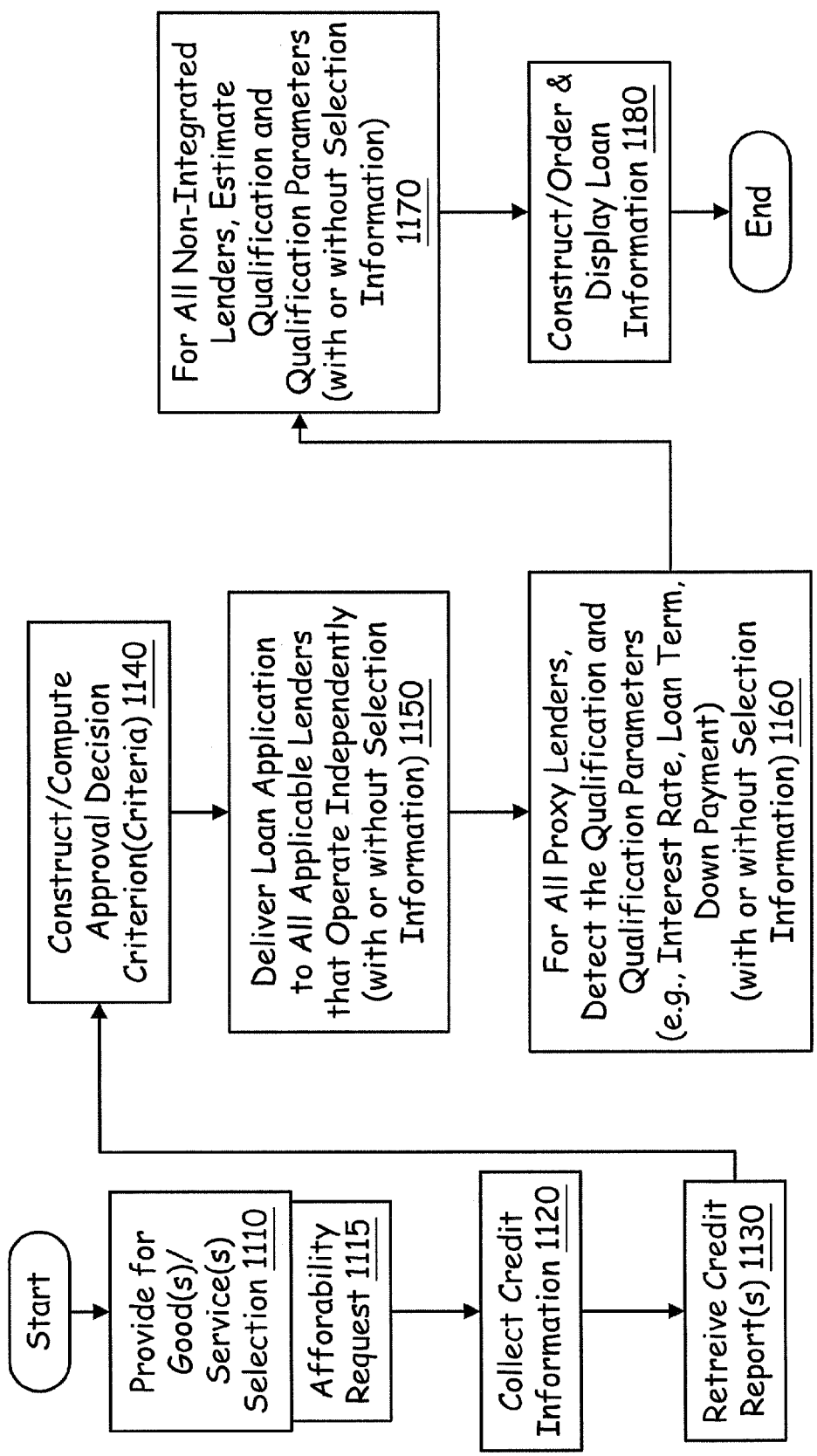
FIG. 11 is a functional block diagram illustrating another embodiment of online, affordability-based filtering performed in accordance with the present invention.
Figure 12:
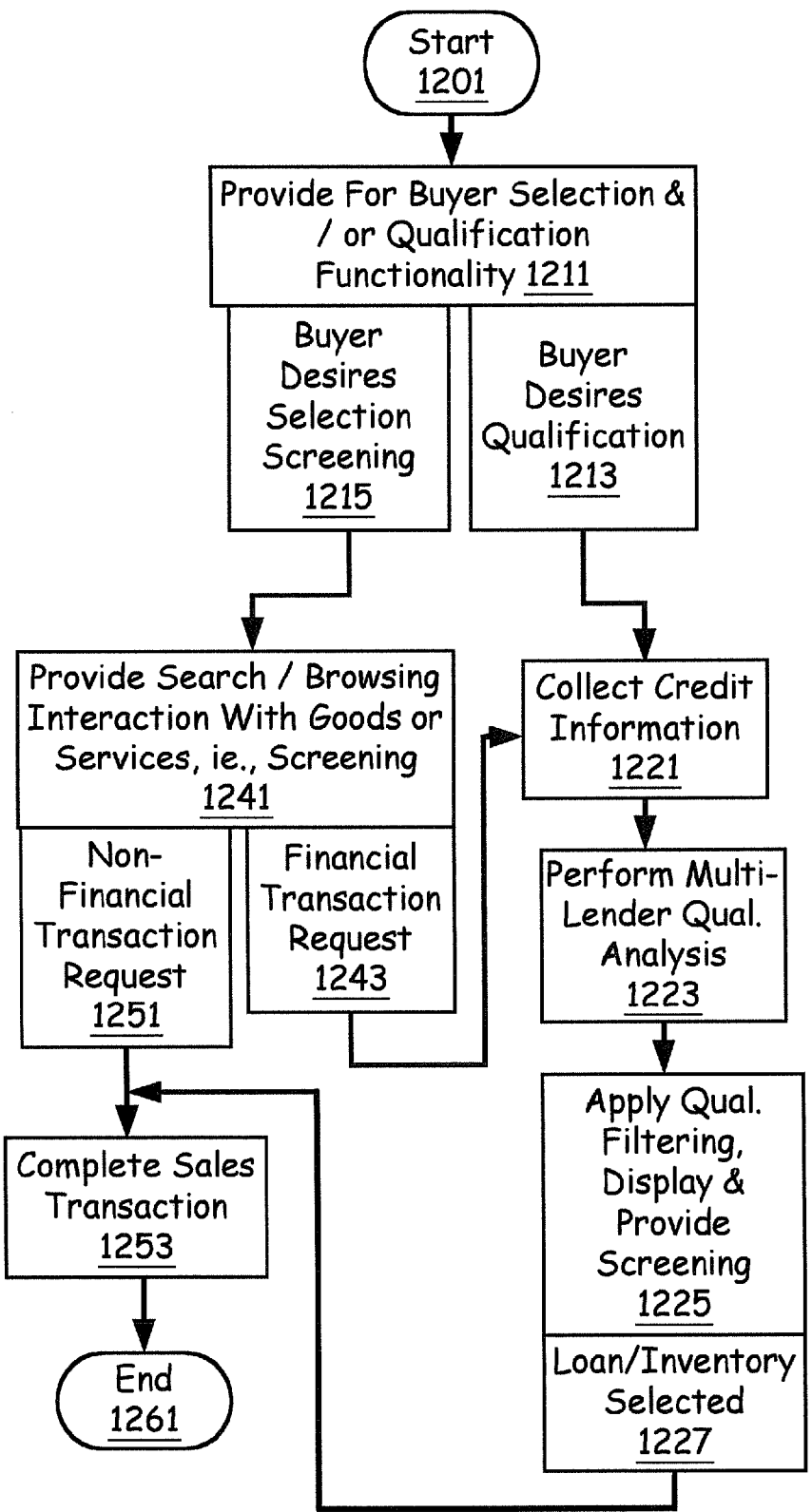
FIG. 12 is a flow diagram that illustrates a buyer's exemplary action with the present invention.

FIG. 11 is a functional block diagram illustrating another embodiment of online, affordability-based filtering performed in accordance with the present invention. The method 1100 provides for the option of selection. In a block 1110, all of the available good(s) and/or service(s) are provided for selection. Then, when an affordability request 1115 is made, the method proceeds to collect credit information in a block 1120. Subsequently, in a block 1130, a predetermined number of credit reports are retrieved.

Then, in a block 1140, an approval decision criterion is generated or constructed. If desired, multiple approval decision criteria may be generated or constructed in the block 1140. Then, in a block 1150, loan applications are delivered to all applicable integrated lenders that operate independently. Those integrated lenders that do not operate independently, but that operate within the system performing the method 1100, automatically receive loan applications corresponding to the buyer. The delivering of the loan applications in the block 1150 may be performed with or without selection information. For example, the information provided to the applicable lenders that operate independently may or may not contain any information pertaining to any selection of good(s) and/or service(s) performed in the block 1110.

Then, in a block 1160, qualification and qualification parameters are detected for all proxy lenders. Examples of qualification parameters include interest rate of a loan, the term of a loan, and the down payment to be paid for the loan. For all of the lenders that are not integrated, the qualification and qualification parameters corresponding to those lenders are estimated in a block 1170. Again, this can be done with or without selection information. Then, in a block 1180, the loan information is constructed/ordered and displayed to a buyer. The system may display such information as whether or not the local area network is approved, the particular lenders for whom the buyer can secure financing, and other information pertaining to the securing of a loan for the buyer. Finally, while not shown in FIG. 11, the qualification parameters that are either detected in the block 1150 or are estimated in the block 1160 may be used to filter the offering.

As previously described, a buyer interacts with the online, affordability-based purchasing system of the present invention through the buyer's, lender's or dealer's computer system. The online, affordability-based purchasing system is typically comprised of a web server that operates to perform affordability-based purchasing functionality via conventional web browser software. At a block 1201, a buyer initiates interaction with the online, affordability-based web server through an Internet connection. The web server provides a series of HTML screens to the buyer offering the sale and financing of an inventory of goods at an event block 1211.

The buyer may choose to interact with the affordability-based web server by immediately attempting a credit analysis at a block 1213 to determine whether or not they can qualify for any or all of the goods in inventory. Doing so will prevent the buyer from having to waste time and efforts reviewing and analyzing descriptions of goods or services that the buyer cannot afford to finance. If so, the web server delivers a credit application web page to the buyer at a block 1221. Once it receives the credit information, the web server performs multi-lender qualification analysis at a block 1223. This entails pulling credit reports online and using the information pulled, along with the other credit information provided at the block 1221, to calculate whether the buyer meets the loan offering conditions of each and every participating lender.

Afterwards, the web server, through interaction with the buyer's browser, provides the display of only those items in inventory (or services) that the buyer can afford to purchase through financing, at a block 1225. The web server also supports full screening functionality to assist the buyer in locating one or more specific items in inventory. Along with traditional selection considerations such as quality or price, the buyer may also consider the financing offered in making their decision to purchase a good. Upon request by the buyer, the web server delivers the financing information, e.g., the lenders, the term, and associated costs, to the buyer, at the block 1225. Upon selecting a loan and inventoried item or service at a block 1227, the web server interacts with the buyer through the buyer's browser at a block 1253 to complete the sales transaction, and then ends the interaction at a block 1261.

If the assortment of inventory of items or services is extensive, the buyer may choose, at the block 1215, to screen some of the inventory or services at a block 1241. Screening may be performed by either selecting those things in inventory or services that the buyer would like to further consider or by selecting items in inventory or services that the buyer does not want to further consider. If the buyer selects a single good or service after performing screening at the block 1241, the buyer may choose to finance at a block 1243 or choose to pay with check, credit, EFT (electronic funds transfer) or other non-financing method at a block 1251. By selecting the latter, the buyer can interact with the web browser to complete the sales transaction 1253 before ending at a block 1261. Should the buyer indicate the desire to seek financing at the block 1243, the buyer is directed to the blocks 1221 and 1223 to collect and analyze credit information to determine whether the buyer can afford to finance a single good or service or the subset of goods or services identified by the buyer at the block 1241. Thereafter, the web server permits the buyer to review the "affordable" goods or services and the corresponding loan offerings at the block 1225 for selection at the block 1227. Any selected one or more goods and services and corresponding loan(s) are completed as before at the block 1253. Thus, although there are many other ways that interaction may occur between the buyer and a seller, the present invention permits the buyer to use the affordability filtering as a tool to help them quickly and easily select one or more goods or services from a plethora of offerings that they may or may not be able to finance. Such affordability filtering may take place at any time during the buyer's screening process, including, as illustrated, before the buyer attempts to screen.

As used throughout herein, a lender's loan offerings shall include typical term loans wherein the buyer owns the good at the end of the loan term, lease offerings wherein ownership is retained by the lessor, and any other type of financing.

Figure 13:
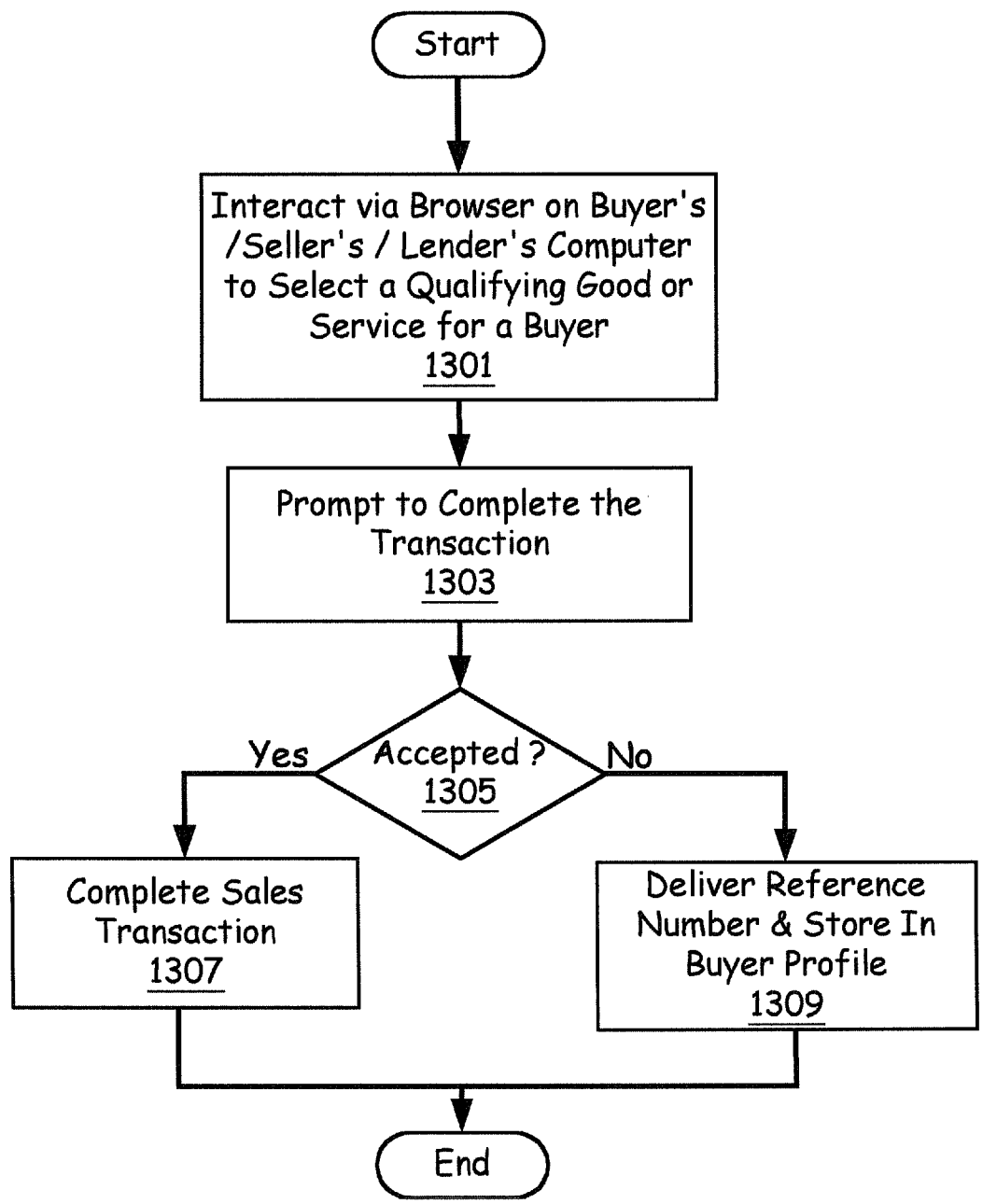
FIG. 13 is a flow diagram illustrating a buyer's interaction via a web browser with a web server that performs online, affordability-based purchasing wherein a buyer's profile is created to extend the purchasing transaction through multiple sessions.

FIG. 13 is a flow diagram illustrating a buyer's interaction via a web browser with a web server that performs online, affordability-based purchasing wherein a buyer's profile is created to extend the purchasing transaction through multiple sessions. In particular, a buyer interacts at a block 1301, to select a good or service using affordability screening. Once the good or service and the specific financing is selected at the block 1301, the buyer is prompted to complete the transaction at a block 1303. If, at a block 1305, the buyer accepts, the transaction is completed at the block 1307. However, if the buyer does not accept at the block 1305, the transaction is saved as part of the buyer's profile at a block 1309. If, possibly many days later, the buyer decides to complete the transaction and purchase through financing the good or service, the buyer may retrieve the profile information and complete the deal.

When the buyer attempts to complete the extended transaction session, the web server first verifies that the offer (i.e., the price, the good or service, and the selected loan) is still available. If so, the buyer is prompted to complete the transaction at the block 1307.

Figure 14:
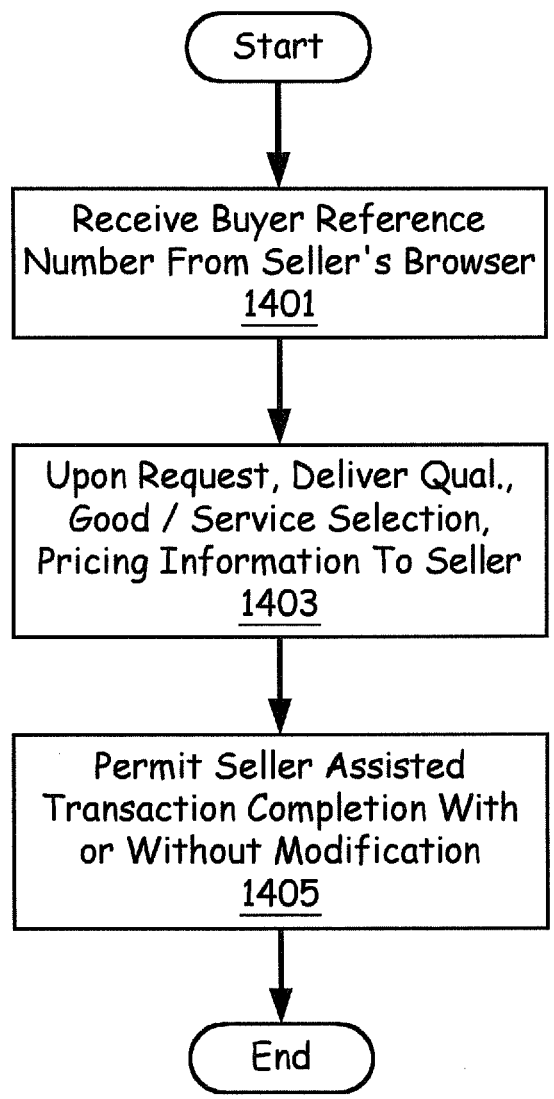
FIG. 14 is a flow diagram that illustrates further functionality of the online, affordability-based purchasing system of the present invention, wherein the purchasing (or leasing) transaction occurs through multiple sessions involving not only a buyer, but also a seller.

FIG. 14 is a flow diagram that illustrates further functionality of the online, affordability-based purchasing system of the present invention, wherein the purchasing (or leasing) transaction occurs through multiple sessions involving not only a buyer, but also a seller. Specifically, a buyer may interact with an affordability-based web server via the buyer's web browser to identify a good or service that the buyer is considering purchasing with financing, for example as described in reference to the flow set forth in the blocks 1301, 1303, 1305 and 1309 of FIG. 13. The buyer may choose not to complete the transaction due to a variety of reasons, including, but not limited to, requiring or needing a seller's participation in the closing of the transaction.

If the buyer does so choose, the affordability-based web server delivers the transaction information to the seller at a block 1401. In an exemplary embodiment, this entails the affordability-based web server's delivery of a buyer reference number to the seller. Such delivery involves one or both notification via email to the seller and via the seller's browser when the seller interacts directly with the affordability-based web server. Thereafter, the seller may request the selected loan and good or service information from the buyer's profile for further consideration at a block 1403. At a block 1405 the seller interacts with the web based server to complete the transaction. This may involve direct interaction online or via telephone with the buyer. For example, the seller may telephone the buyer, and while the buyer and seller both are interacting to view the offer through the Internet, the seller may convince the buyer to complete the deal with or without modification to the current offering by decreasing the price, offering a different loan, or offering a different or additional good or service to the buyer.

Alternatively, the buyer fail to complete the transaction at home on the buyer's own browser, yet choose to visit the seller to inspect the good and then complete, with or without the seller's assistance, the transaction online.

Figure 15:
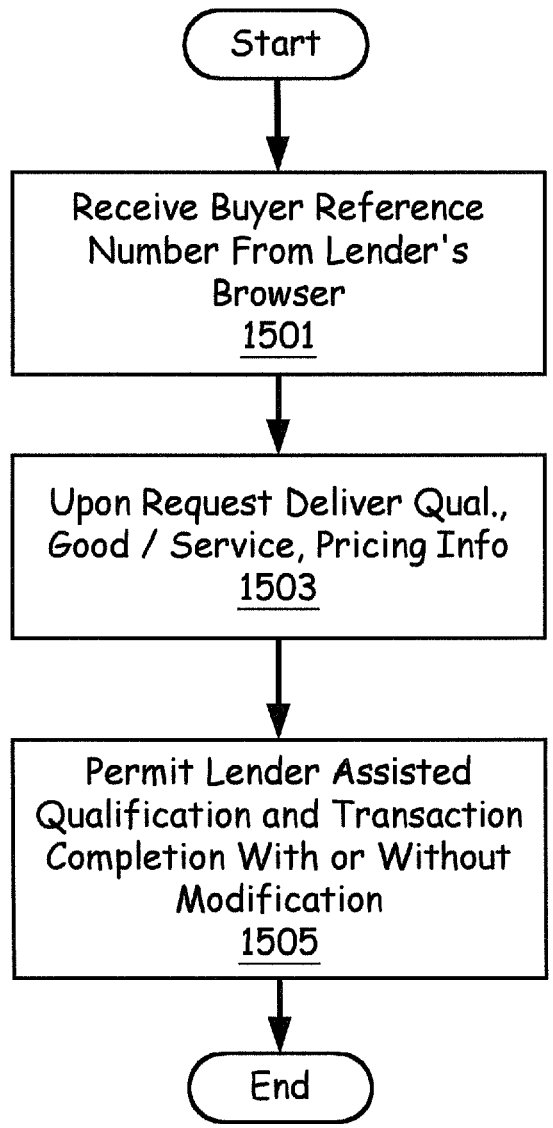
FIG. 15 is a flow diagram that illustrates further functionality of the online, affordability-based purchasing system of the present invention wherein a buyer may use a lender's online, telephonic or in-person assistance in closing a transaction that spans multiple buyer's, seller's, and lender's sessions.

FIG. 15 is a flow diagram that illustrates further functionality of the online, affordability-based purchasing system of the present invention wherein a buyer may use a lender's online, telephonic or in-person assistance in closing a transaction that spans multiple buyer's, seller's, and lender's sessions. Using affordability screening, a buyer may select one or more goods or services, but decide not to complete the transaction. As mentioned before with reference to FIG. 13, the buyer may save the pending transaction for a later session's retrieval and consideration by the buyer, a lender and/or seller.

The buyer may interact with a lender (or a seller) while the buyer is currently interacting online via the buyer's browser with the affordability-based web server. In this mode, the buyer may send an indication to either the buyer or the lender that the buyer desires assistance in completing the transaction. In response, if a lender has personnel available online, the lender will receive the buyer's request which includes a reference from which the lender may retrieve the buyer's transaction information in order to assist the buyer in completing the transaction. Upon the lender selecting to respond, the affordability-based server establishes a white board between the buyer and the lender through which typed questions and answers can be instantly communicated in a real-time manner.

If the lender is currently unavailable, the affordability-based server will inform the buyer that the lender will respond as soon as the lender becomes available, or via email or telephone. In many cases, a telephone conference between the buyer and lender may be appropriate where both the buyer and lender are viewing the transaction information online. Alternatively, voice messages with or without associated video may be exchanged online as well.

Such interaction and functionality is also applicable to interaction between the buyer and the seller, the seller and the lender, and between the buyer, lender and seller. All the while the affordability-based web server keeps track of the entire transaction through such multiple sessions with multiple parties through the buyer's transaction profile.

In the specific embodiment illustrated in FIG. 15, a lender receives a buyer's reference number at a block 1501. Using the transaction reference number, the lender is able to retrieve the transaction information at a block 1503. Through online and/or telephonic interaction, at a block 1505, the affordability-based web server assists the lender in convincing the buyer to complete the transaction. This may involve adjustments by the lender to the financing offering, including, but not limited to, the term, the interest rate, the down payment, etc. The lender may similarly interact with a seller to convince the seller to select the lender by, for example, offering the seller an incentive possibly beyond those currently offered by other lenders for the transaction in issue. Such incentive may be a referral fee or an increase in the points paid for the seller's loan origination. The lender may also convince the buyer or seller by selecting and offering alternate financing options, such as leasing.

Figure 16:
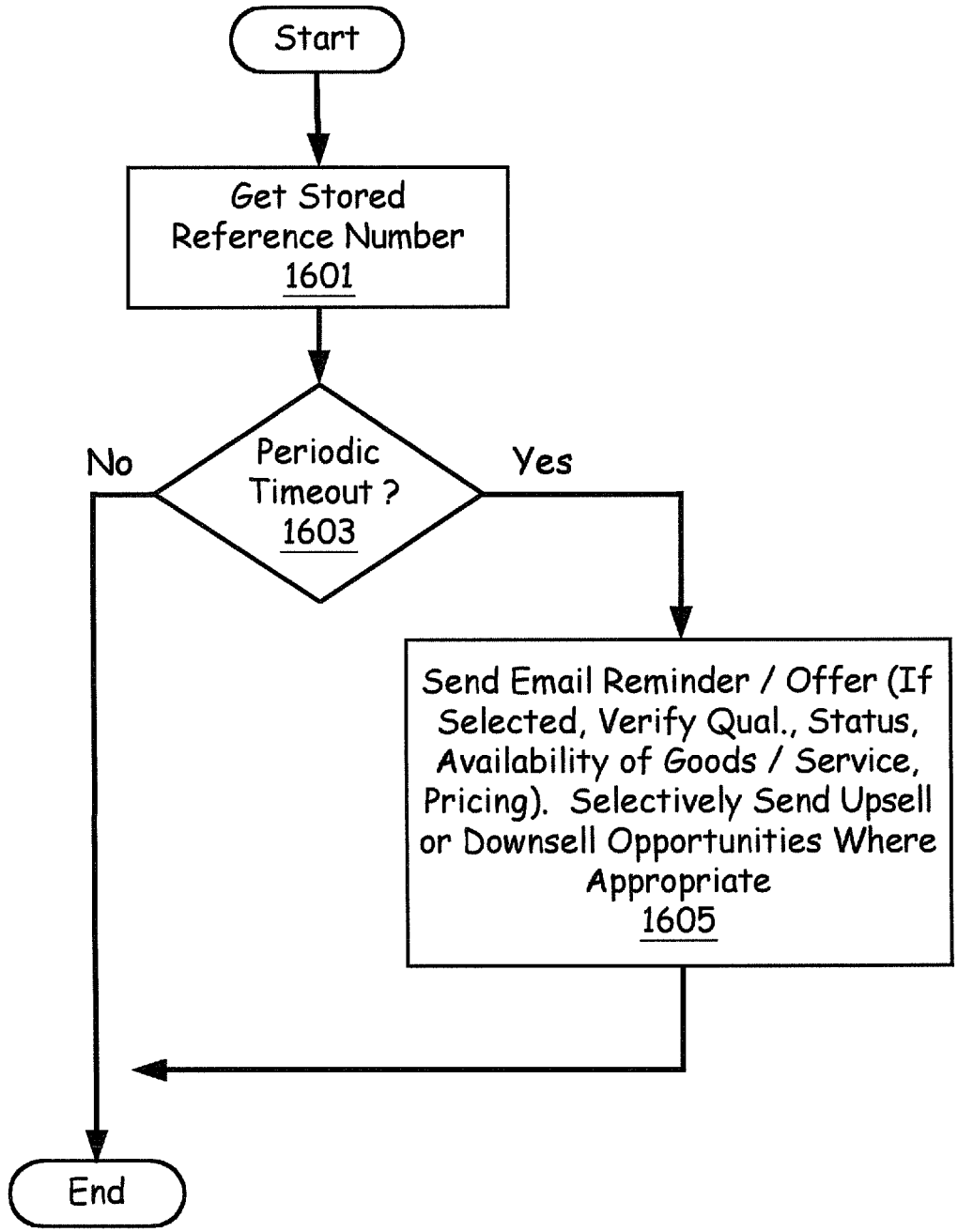
FIG. 16 is a flow diagram that illustrates various aspects of sales persistence of the online, affordability-based purchasing system of the present invention.

FIG. 16 is a flow diagram that illustrates various aspects of sales persistence of the online, affordability-based purchasing system of the present invention. Periodically, the online, affordability-based web server will select each pending transaction reference number stored therein at a block 1601. If the underlying transaction information meets certain conditions including a time threshold of inactivity, at a block 1603 the web server will respond with one or more of a plurality of persistent sales techniques to entice the buyer, lender and seller to close the transaction.

Specifically, at a block 1605, the affordability-based web server will send email reminders to one or more of the buyer, lender, or seller identifying aspects of the underlying transaction including the transaction reference number, permitting easy retrieval of the transaction information upon, for example, a single mouse click. The web server may also choose to offer promotions, such as coupons, rebates, etc., or identify similar goods or services that may entice the buyer (lender or seller) to close the transaction.

Also via email, the affordability-based web server periodically, as defined by the block 1603, checks that a seller's current good or service offerings, pricing, and/or corresponding loan offering are still available as identified in the pending transaction. If any changes are found, the buyers, lender and/or seller receives an email communication from the web server describing the differences found. For example, a buyer who has nearly closed a transaction based on selection of a particular loan and good offered by a particular seller may receive a communication via, for example email, from the affordability-based web server. The communication might state that there is only twenty-four (24) hours left to complete the transaction as previously selected because, for example, the lender's or seller's offering may be changed or retracted at the end of the twenty-four (24) hour period. Similarly, the affordability-based web server may identify an additional and superior loan offering or good pricing that may convince the buyer to complete the transaction. Thus, in response, the web server will communicate such differences in the underlying stored transaction to the buyer. With a click of mouse via the buyer's email notification, the buyer will be served web pages from the web server that reestablishes the underlying transaction with the incentive from the underlying communication offered therein. The buyer may also access the web server directly without vectoring from the underlying communication to view and select such incentives.

Such incentives and changes in underlying pending transactions are generated by the affordability-based web server, via a persistent sales management browser-based interaction with the web server. Such interaction may occur with personnel that operate the web server, and through seller or lender interaction via their respective browsers with or without buyer anonymity. Thus, a lender or seller may determine how many prospective buyers are considering their loans, goods or services and may attempt to interact to complete such transactions through the affordability-based web server.

Figure 17:
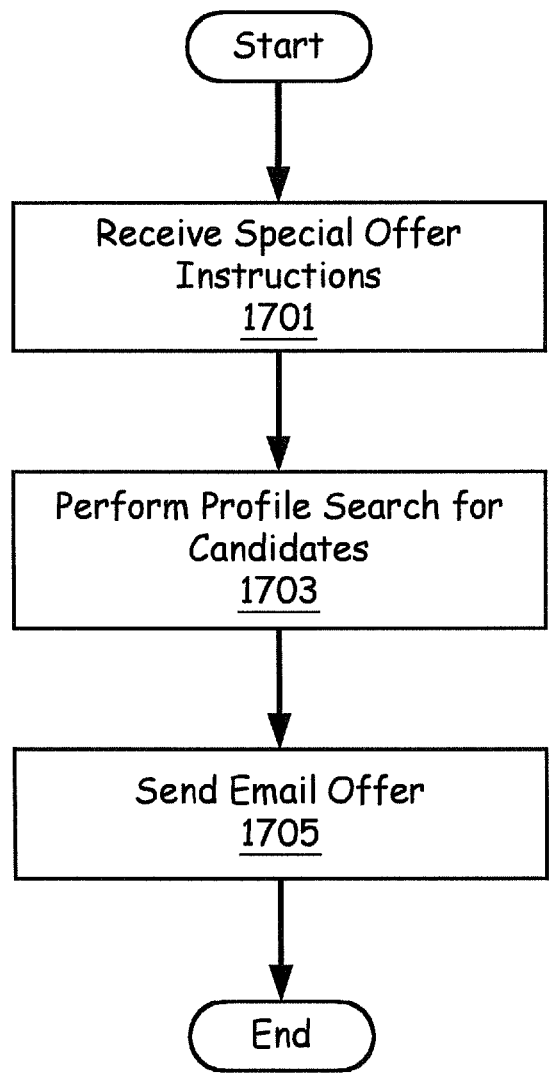
FIG. 17 is a flow diagram of the online, affordability-based purchasing system, wherein a seller or a lender may identify buyers having pending underlying transactions involving, or who have shown interest in, the goods, services, or financing of the lender or seller.

FIG. 17 is a flow diagram of the online, affordability-based purchasing system, wherein a seller or a lender may identify buyers having pending underlying transactions involving, or who have shown interest in, the goods, services, or financing of the lender or seller. Specifically, at a block 1701, the lender or the seller may interact with the affordability-based web server via their web browser to deliver special incentive instructions to the web server. Such instructions include identifying the criteria by which potential buyers are identified, characteristics of the offered incentive, and the mechanism for communicating the incentive to the buyer.

In response, at a block 1703, the affordability-based web server may search through the buyer's profile for a subset of buyers that meet the lender's or seller's conditions. Thereafter, the affordability-based web server communicates the seller's or lender's offer to the subset of buyers. Such communication takes the form of an email offer at a block 1705, although other communication methods may be used. Although not shown, the affordability-based server also automatically bills the seller or lender for such services rendered based on the number of buyers actually contacted. Again, such contacts may be anonymous, or the subset of buyers may be identified directly to the lender or seller.

Special offer incentives may include coupons, rebates, additional services or goods, sponsor dollars, etc., possibly bounded by limitations in time to which the incentives will be valid. Many other conventional incentive, or promotional techniques may be used.

A potential buyer may be selected based on many factors. For example, only buyers with pending underlying transactions involving a lender that is offering the specific incentive may be contacted. Alternatively, for example, a seller may contact any buyer that has been qualified by a lender to purchase a similar good or service.

Figure 18:
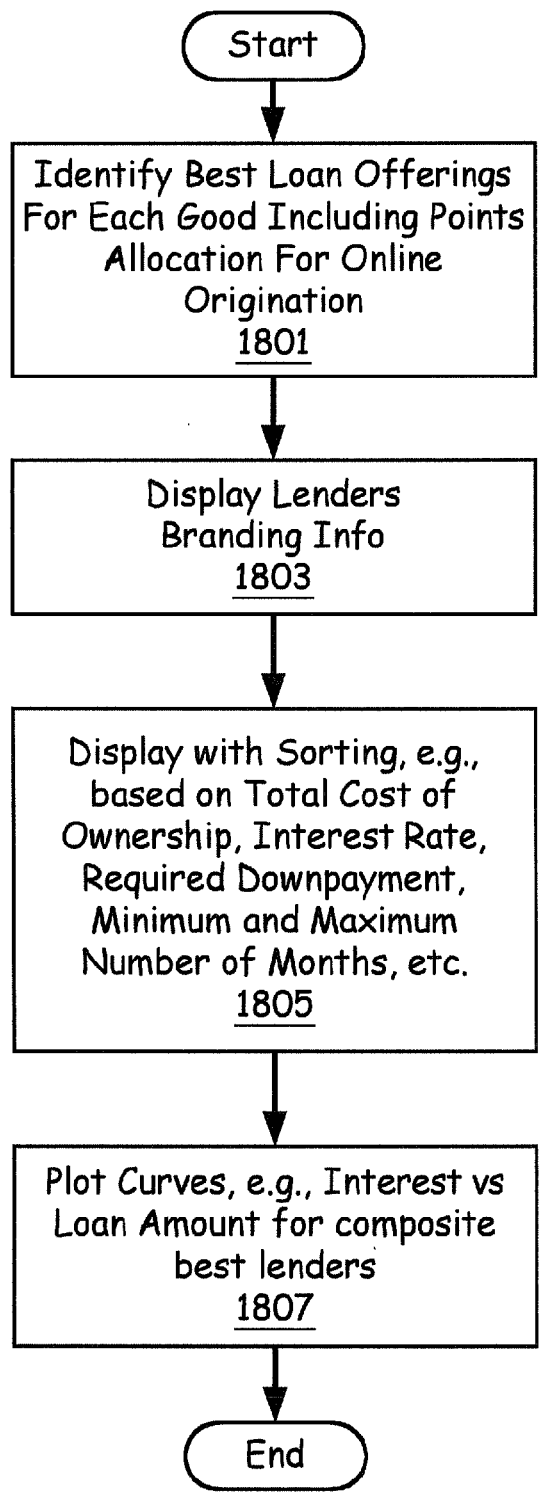
FIG. 18 is flow diagram illustrating the functionality of the online, affordability-based purchasing system of the present invention with reference to the selection of one of a plurality of loan offerings for a given good or service selected.

FIG. 18 is flow diagram illustrating the functionality of the online, affordability-based purchasing system of the present invention with reference to the selection of one of a plurality of loan offerings for a given good or service selected. The affordability-based web server, at a block 1801, uses the credit information collected from a buyer along with one or more retrieved credit reports as a basis for affordability screening. The web server interacts with a buyer's, lender's or seller's browser to display sufficient information regarding each financing option associated with a particular selected good so that the selection of the financing may be made.

Specifically, the affordability-based web server delivers web pages identifying each finance offering, along with a plurality of parameters associated with each, for display and comparison. Such parameters include, for example, whether the finance option is a lease or a loan type offering, monthly payments, down payments, balloon payments, loan term, total cost of ownership or total cost of leasing, origination point allocation, deadlines for exercising, other restrictions, lender branding information and marks, etc.

At blocks 1803, 1805 and 1807, the affordability-based web server interacts with a buyer's, lender's or seller's browser to cause the display of various information regarding finance offerings so that an offering may be selected or adjusted based on a comparison of competing finance offerings. For example, a lender may interact with the affordability-based web server to compare the loan offering that was automatically generated using the lender's loan parameters with other lender's loan offerings. In response, the lender may adjust, for example, its interest rate to entice the buyer into selecting its loan offering over that of its competitors. Likewise, the lender might adjust the point allocation for origination to entice a seller into selecting the lender's loan offering over other lender's offerings.

In particular, at a block 1803, the affordability-based web server delivers web pages that display each lender's branding information along with, at a block 1805, other loan parameters. The display may be automatically sorted based on any of such parameters so that a single finance offering may be selected. To assist in this process, charts are constructed, e.g., a plot of interest rate versus loan amount may be displayed at a block 1807.

Figure 19:
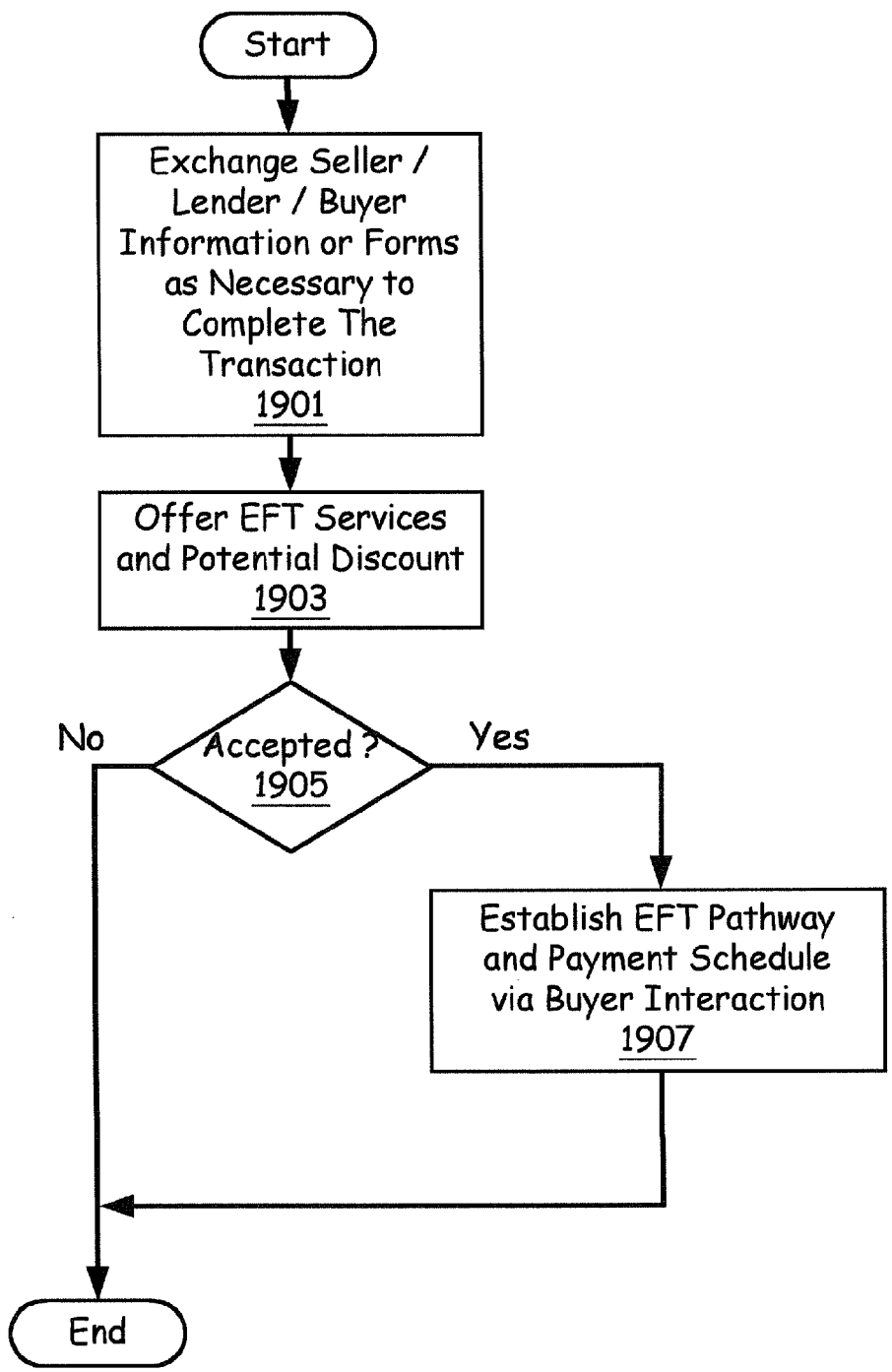
FIG. 19 is a flow diagram that illustrates one way that the costs of financing may be reduced in the online, affordability-based purchasing system of the present invention.

FIG. 19 is a flow diagram that illustrates one way that the costs of financing may be reduced in the online, affordability-based purchasing system of the present invention. At a block 1901, the affordability-based web server identifies all forms necessary to complete the sale and financing transaction for the seller, lender and buyer. With such forms, the affordability-based web server uses information from the buyer's profile and underlying transaction to pre-fill the forms, and then prompts either the buyer, lender or seller as necessary to complete the transaction. To accomplish this process, the forms may be electronically routed via, for example, the Internet to each of the seller, lender and buyer as necessary, or may be printed by any of the parties for completion of the transaction offline. In this way, the seller and lender, for example, need not know the specific requirements of each or the associated forms needed. EFT (electronic funds transfer) services are offered at a block 1903 with associated discounts. Should the buyer accept such offering at a block 1905, the affordability-based web server will interact with the buyer to establish the EFT pathway and payment schedule using information from the buyer's profile along with supplemental information gathered directly from the buyer, at a block 1907.

Through the online, affordability-based purchasing system of the present invention, the buyer may interact in many ways to complete a transaction. For example, the buyer may pre-select one or more goods or services or good or service types through "screening", filter those of the goods or services that the buyer cannot afford to finance, select a specific good or service and associated financing, arrange for the delivery of the good or service, and complete the transaction online in a single session. Alternatively, for example, the buyer may start the process at a lender to select one or more goods or services that the lender will finance, review and possibly alter the selections at home, then travel to evaluate the goods or services at the seller's site where the buyer can complete the transaction.

The buyer may also use the affordability-based web server to track affordability-based change(s) resulting from underlying credit report changes or from a seller's price discounting or from a new finance offering. When such change(s) occur, the affordability-based web server will respond by emailing the buyer regarding the change(s). The affordability-based web server will detect such change(s) by periodically retrieving the buyer's credit report, good or service information from the seller, and/or financing information from a lender. For example, a buyer may select a car for which the buyer is currently unable to afford financing, and direct the affordability-based web server to check to see if financing for the vehicle becomes available. Such checking may occur at a pre-selected frequency, for example, once every fifteen (15) days.

To assist the buyer in this process and to generally make the buyer more credit worthy, the affordability-based web server delivers credit management web pages to the buyer for viewing through the buyer's web browser. The credit management pages permit the buyer to play a "what if" game wherein the buyer can instantly determine the value of paying down a loan, adding or removing a credit card, settling a loan, etc. Instead of merely estimating a change in the credit rating, the affordability-based web server will use the "hypothetical" credit information to perform affordability searches against real product or service inventories. The buyer may choose to view only such goods or services that become available because of the underlying credit report changes. Thus, for example, a buyer may choose to pay down a loan by $3,000.00 while decreasing a down payment by $3000.00 in order to achieve financing. Underlying the affordability screening process, the affordability-based web server need only pull the one or more credit reports from the credit reporting services once each 30-day period. Because the affordability-based web server is performing a credit analysis and is not a lender, the credit reporting agencies need not adjust the buyer's credit rating as it does for conventional lender's inquiries. Moreover, if, using conventional financing approaches, the buyer inquired about financing from a plurality of lenders for a plurality of goods they could not afford, the buyer's credit rating would be adjusted negatively, with potentially hundreds of rejection letters. With the affordability-based web server, the identity of the buyer is never communicated to a lender unless the buyer selects a specific lender that pre-qualified the buyer for purchasing a specific good or service. No longer will the efforts required in serving rejection letters be needed. And no longer will credit reporting bureaus have to deliver credit reports to all of the lenders that the buyer may approach in attempting to gain financing for a particular good or service. Similarly, sellers will not need to waste time or effort attempting to sell goods or services to buyers who are unable to gain financing.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A web server system, comprising:
    a non-transitory memory; and
    one or more hardware processors coupled to the non-transitory memory and configured to execute the instructions from the non-transitory memory to cause the web server system to perform operations comprising:
        receiving a request, from a first online website generated by one or more server engines of the web server system, wherein the request is received based at least on an input to a user device detected by the first online website;
        retrieving personal information from the request associated with the input detected by the first online website;
        identifying product information from the request that indicates at least one product on a second online website;
        determining, by a filtering component of the web server system, at least one financing vehicle from a plurality of databases of the web server system based at least on the personal information and the at least one product available on the second online website;
        determining, by the one or more server engines, an approval for the at least one financing vehicle to obtain the at least one product on the second online website based at least on the personal information; and
        causing, by the one or more server engines, the user device to display an indication of the approval for the at least one financing vehicle to obtain the at least one product from the second online website based at least on the personal information.

2. The web server system of claim 1, wherein the first online website comprises a frame of the second online website with contents associated with the at least one product, wherein the request is received from the frame of the second online website.

3. The web server system of claim 1, wherein the request is received by a frame of the second online website with contents illustrating the at least one product, and wherein the input is detected from the frame of the second online website.

4. The web server system of claim 2, wherein the personal information is retrieved from a component of the user device.

5. The web server system of claim 1, wherein the operations further comprise:
causing the user device to further display a frame of the second online website comprising one or more products related to the at least one product.

6. The web server system of claim 5, wherein the frame of the one or more related products comprises at least a pre-approval indication to use the at least one financing vehicle.

7. The web server system of claim 1, wherein the operations further comprise:
initiating a purchase of the at least one product with the at least one financing vehicle based at least on a confirmation from the user device detected by the first online website.

8. A non-transitory machine-readable medium having stored thereon machine-readable instructions executable to cause a machine to perform operations comprising:
receiving a request, from a first online website generated by one or more server engines, wherein the request is received based at least on an input to a user device detected by the first online website;
retrieving personal information based at least on the request associated with the input detected by the first online website;
identifying product information from the request that indicates at least one product available on a second online website;
determining, by a filtering component associated with the machine, at least one financing vehicle from a plurality of databases based at least on the personal information and the at least one product on the second online website;
determining, by the one or more server engines, an approval for the at least one financing vehicle to obtain the at least one product on the second online website based at least on the personal information; and
causing, by the one or more server engines, the user device to display an indication of the approval for the at least one financing vehicle.

9. The non-transitory machine-readable medium of claim 8, wherein the operations further comprise communicating the indication of the approval to the user device via the first online website to obtain the at least one product from the second online website based at least on the personal information.

10. The non-transitory machine-readable medium of claim 9, wherein the indication is communicated with a frame of the second online website displayed in the first online website.

11. The non-transitory machine-readable medium of claim 10, wherein the operations further comprise communicating an email to the user device comprising a link to the first online website comprising the frame of the second online website, wherein the frame comprises contents associated with the at least one product.

12. The non-transitory machine-readable medium of claim 8, wherein the plurality of databases comprises a third party database, and wherein the at least one financing vehicle is determined from the third party database.

13. The non-transitory machine-readable medium of claim 8, wherein the operations further comprise processing a purchase of the at least one product using the at least one financing vehicle based at least on a confirmation from the user device detected by the first online website.

14. The non-transitory machine-readable medium of claim 13, wherein the operations further comprise communicating information associated with the confirmation to the user device.

15. A method, comprising:
receiving a request, from a first online website generated by one or more server engines, wherein the request is received based at least on an input to a user device detected by the first online website;
retrieving personal information based at least on the request associated with the input detected by the first online website;
identifying product information from the request that indicates at least one product available on a second online website;
determining, by a filtering component of the one or more server engines, at least one financing vehicle from a plurality of databases of the one or more server engines based at least on the personal information and the at least one product on the second online website;
determining, by the one or more server engines, an approval for the at least one financing vehicle to obtain the at least one product on the second online website based at least on the personal information; and
causing, by the one or more server engines, the user device to display an indication of the approval for the at least one financing vehicle.

16. The method of claim 15, wherein the first online website comprises a frame of the second online website, and wherein the request and the personal information is received through the frame of the second online website.

17. The method of claim 15, wherein the request is received by a frame of the second online website with contents illustrating the at least one product.

18. The method of claim 16, further comprising communicating the indication of the approval to the user device with the first online website.

19. The method of claim 15, further comprising:
receiving an acceptance from the first online website based at least on a second input to the user device detected by the first online website, wherein the acceptance is based at least on the approval for the at least one financing vehicle; and
processing the acceptance from first online website with the at least one financing vehicle.

20. The method of claim 19, further comprising:
obtaining the at least one product with the at least one financing vehicle; and
communicating information associated with the at least one product to the user device through a frame of the first online website comprising contents of the second online website with the at least one product.

21. A web server system, comprising:
means for receiving a request, from a first online website generated by one or more server engines, wherein the request is received based at least on an input to a user device detected by the first online website;

means for retrieving personal information from the request associated with the input detected by the first online website that provides a frame of a second online website comprising at least one product;

means for determining at least one financing vehicle from a plurality of databases based at least on the personal information and the at least one product on the second online website;

means for determining an approval for the at least one financing vehicle to obtain the at least one product on the second online website; and means for causing the user device to display an indication of the approval for the at least one financing vehicle.

\* \* \* \* \*